United States Patent
Lum

(10) Patent No.: US 6,272,529 B1
(45) Date of Patent: Aug. 7, 2001

(54) POINT-OF-SALE SYSTEM AND DISTRIBUTED COMPUTER NETWORK FOR SAME

(75) Inventor: Jackson Lum, Roslyn, NY (US)

(73) Assignee: Logic Controls, Inc., New Hyde Park, NY (US)

(*) Notice: Subject to any disclaimer, the term of this patent is extended or adjusted under 35 U.S.C. 154(b) by 0 days.

(21) Appl. No.: 09/079,962

(22) Filed: May 15, 1998

Related U.S. Application Data

(63) Continuation-in-part of application No. 08/899,290, filed on Jul. 23, 1997, now Pat. No. 5,895,452, which is a continuation of application No. 08/350,587, filed on Dec. 6, 1994, now abandoned, which is a continuation of application No. 08/011,461, filed on Jan. 26, 1993, now abandoned.
(60) Provisional application No. 60/046,779, filed on May 16, 1997.

(51) Int. Cl.$^7$ .................................................. G06F 15/16
(52) U.S. Cl. .......................... 709/203; 709/201; 709/208; 709/209; 710/105; 705/16
(58) Field of Search .................................... 709/201, 208, 709/203, 209, 228; 710/62, 31, 71, 11, 105; 370/460; 705/21

(56) References Cited

U.S. PATENT DOCUMENTS

| T948,012 | 7/1976 | Bouknecht et al. | |
|---|---|---|---|
| 3,898,373 | 8/1975 | Walsh | 178/2 C |
| 4,181,936 | 1/1980 | Kober | 709/212 |
| 4,304,001 | 12/1981 | Cope | 714/4 |
| 4,314,334 * | 2/1982 | Dauhton et al. | 710/3 |
| 4,387,425 | 6/1983 | El-Gohary | 709/225 |
| 4,443,866 | 4/1984 | Burgiss, Sr. | 710/100 |
| 4,484,273 | 11/1984 | Stiffler et al. | 710/110 |
| 4,516,201 | 5/1985 | Warren et al. | 709/234 |
| 4,547,850 | 10/1985 | Genma | 709/253 |
| 4,592,012 * | 5/1986 | Braum | 710/36 |
| 4,626,844 | 12/1986 | Mann et al. | 340/5.5 |
| 4,641,266 | 2/1987 | Walsh | 710/111 |
| 4,688,171 | 8/1987 | Selim et al. | 709/208 |
| 4,742,484 | 5/1988 | Yanai et al. | 709/208 |
| 4,817,037 | 3/1989 | Hoffman et al. | 710/110 |
| 4,852,043 | 7/1989 | Guest | 710/101 |
| 4,855,908 * | 8/1989 | Shimoda et al. | 705/20 |

(List continued on next page.)

Primary Examiner—Moustafa M. Meky
Assistant Examiner—Abdullahi Elmi Salad
(74) Attorney, Agent, or Firm—Hoffman & Baron, LLP

(57) ABSTRACT

A distributed computer network is disclosed for use with a general purpose computer having a communications port and capable of running applications software for controlling the network. The distributed computer network includes a master controller having first and second communications ports, the first communications port of the master controller for operatively communicating with a general purpose computer. The distributed network further includes one or more input/output controllers, each having a first communications port for operatively communicating with the master controller and a second communications port for serially communicating with one or more peripheral devices. The peripheral devices are connected together in a serial daisy chain configuration. The master controller communicates with the input/output controllers via a multidrop RS-485 network bus. The master controller also communicates with the general purpose computer via a RS-232 serial bus, so that the master controller performs protocol management functions including conversion between RS-232 and RS-485 protocol, error correction and detection, bus arbitration and data buffering. In one embodiment, the present invention is configured as a Kitchen System. In the Kitchen System embodiment, one or more input/output controllers include an indicating device, such as a buzzer, or a visual or tactile indicating device. The I/O controller also includes a display, such as a video monitor. The I/O controller's input/output peripheral device is preferably a bump bar.

20 Claims, 24 Drawing Sheets

U.S. PATENT DOCUMENTS

| | | | |
|---|---|---|---|
| 4,862,353 | 8/1989 | Williams | 710/101 |
| 4,935,720 | 6/1990 | Kalfoun | 340/286.09 |
| 4,949,299 * | 8/1990 | Pickett | 710/105 |
| 4,972,463 | 11/1990 | Danielson et al. | 379/91.01 |
| 5,018,066 | 5/1991 | Yagi | 705/21 |
| 5,119,294 | 6/1992 | Tanaka | 705/21 |
| 5,128,862 | 7/1992 | Mueller | 705/15 |
| 5,165,024 | 11/1992 | Sweazey | 710/100 |
| 5,179,375 | 1/1993 | Dick et al. | 340/825.51 |
| 5,218,527 | 6/1993 | Ishikawa et al. | 705/15 |
| 5,235,509 | 8/1993 | Mueller et al. | 705/15 |
| 5,313,664 | 5/1994 | Sugiyama et al. | 705/21 |
| 5,371,859 | 12/1994 | Lennartsson | 710/114 |
| 5,410,650 | 4/1995 | Sasaki et al. | 709/250 |
| 5,438,607 | 8/1995 | Przygoda, Jr. et al. | 379/38 |
| 5,444,847 | 8/1995 | Iitsuka | 710/107 |
| 5,446,846 | 8/1995 | Lennartsson | 710/100 |
| 5,510,979 | 4/1996 | Moderi et al. | 705/18 |
| 5,535,336 | 7/1996 | Smith et al. | 709/225 |
| 5,644,700 | 7/1997 | Dickson et al. | 714/9 |
| 5,687,393 | 11/1997 | Brown et al. | 710/29 |
| 5,721,737 * | 2/1998 | Radjabi et al. | 370/449 |
| 5,832,244 * | 11/1998 | Jolley et al. | 710/129 |
| 5,905,908 * | 5/1999 | Wagner | 710/11 |
| 5,956,523 * | 9/1999 | Chen | 710/62 |
| 5,987,426 * | 11/1999 | Goodwin, III | 705/21 |
| 6,067,527 * | 5/2000 | Lovell et al. | 705/21 |

\* cited by examiner

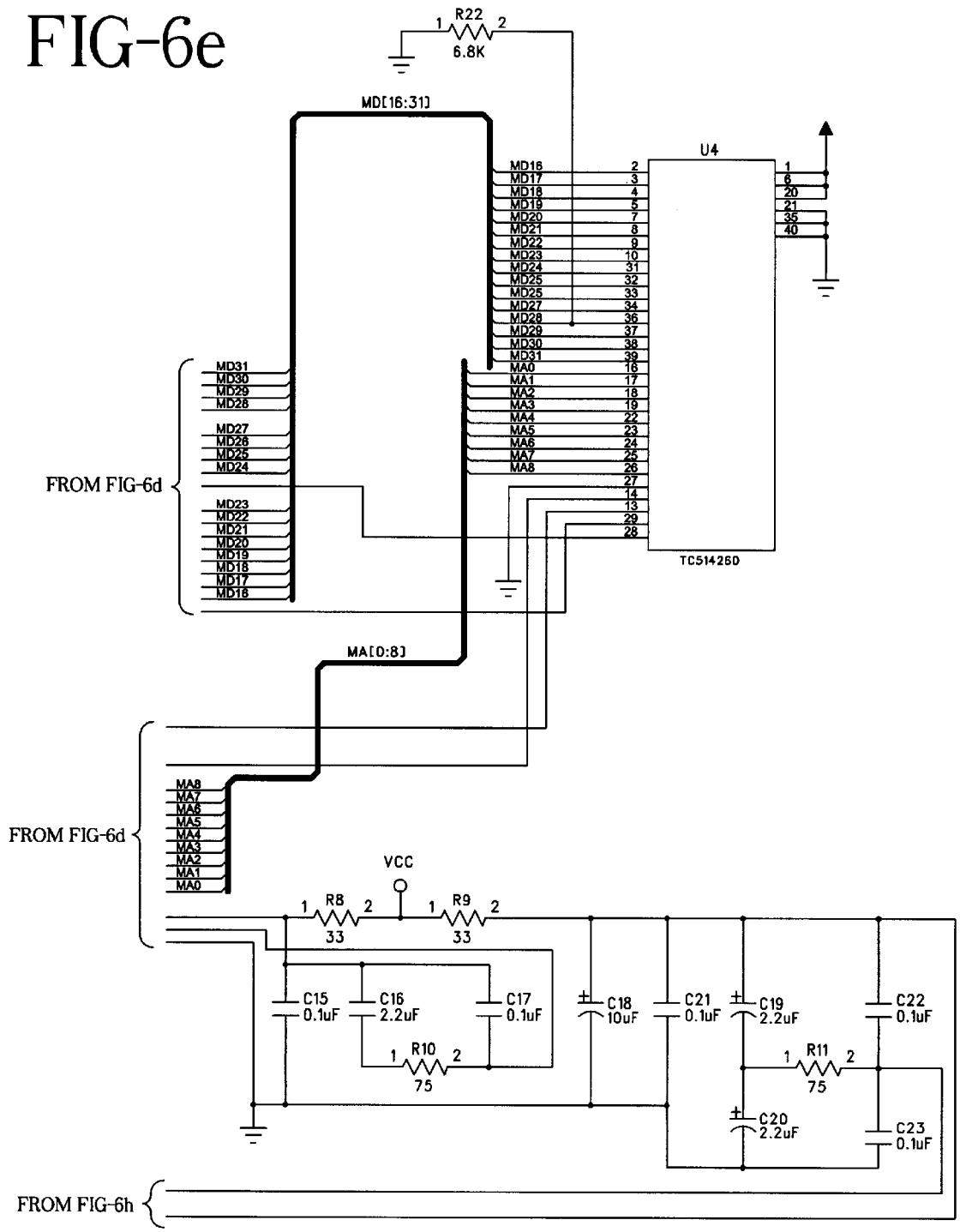

POINT-OF-SALE SYSTEM AND DISTRIBUTED COMPUTER NETWORK FOR SAME

CROSS-REFERENCE TO RELATED APPLICATIONS

This application claims the benefit of U.S. Provisional Application No. 60/046,779, filed on May 16, 1997 entitled "Point of Sale System and Distributed Network for Same," and is a continuation-in-part of U.S. application Ser. No. 08/899,290, filed on Jul. 23, 1997, now U.S. Pat. No. 5,895,452, which is a continuation of U.S. application Ser. No. 08/350,587, filed on Dec. 6, 1994, now abandoned, which is a continuation of U.S. application Ser. No. 08/011,461, filed on Jan. 26, 1993, now abandoned.

BACKGROUND OF THE INVENTION

1. Field of the Invention

The present invention relates generally to computer networks and more specifically relates to a distributed computer network suitable for use with a point-of-sale system.

2. Description of the Prior Art

In a point-of-sale system, a plurality of peripherals, such as cash registers, displays, credit card readers, bar code scanners and the like, need to communicate with a computer server which controls the data processing operations for the system in which these peripherals operate. While computer networks are known for use in point-of-sale systems, these computer networks typically employ standard computer components at each node in the point-of-sale system (see FIG. 1). These systems further include a complex and costly server and hardware which employs a software network communications management system to control communications with each node in the system. Additionally, each node typically requires matching network communications software and hardware which further increases the cost of the system. This network topology, which is conventional to a standard computer data network, results in severe cost and processing overheads which burden a point-of-sale system.

In a conventional personal computer (PC)-based point-of-sale system, the number of standard input/output (I/O) ports available to accept the numerous peripheral components that may be required is clearly limited. Currently, there exist various configurations used to overcome the I/O shortage problems. However, these schemes typically require the addition of dedicated hardware, such as special port concentrator units or PC cards. These hardware additions not only increase the overall system cost but they also burden software developers, who must write special application software to address the added non-standard I/O ports without causing data contention problems created by the duplicate usage of I/O addresses and interrupt request (IRQ) numbers.

An additional problem associated with prior art point-of-sale systems is that, generally, different peripheral devices have different interface requirements. Thus, while one peripheral device may be directly connected to the computer, other devices may require a separate interface box to convert its output data to a format that is compatible with the computer. Furthermore, each input device requires a unique software identification number and interrupt for the computer to communicate with the device. This results in higher hardware costs and more physical space for each peripheral device added to the system.

Accordingly, there remains a need in the fields of point-of-sale systems and others for an alternative computer network tailored to the particular requirements of a network system.

It is, therefore, a goal of the present invention to provide an improved distributed computer network adapted for use with a network system.

It is another goal of the present invention to provide a distributed computer network that allows the connection of multiple peripheral devices with the limited number of input/output ports available.

It is yet another goal of the present invention to provide a distributed computer network that allows the connection of additional peripheral devices without shutting down the computer or reconfiguring the software, thereby reducing system down-time.

It is a further purpose of the present invention to provide a distributed computer network that eliminates the need for special hardware and/or software drivers for peripheral devices, thereby allowing more flexibility in component selection.

It is still a further purpose of the present invention to provide a distributed computer network that allows freedom of physical component placement.

SUMMARY OF THE INVENTION

The foregoing needs, purposes and goals are satisfied in accordance with the present invention, which, in one embodiment provides a distributed computer network for use with a general purpose computer having a communications port and capable of running applications software for controlling the network. The distributed computer network includes a master controller having first and second communications ports, the first communications port of the master controller for operatively communicating with a general purpose computer.

The distributed network further includes one or more input/output (I/O) controllers, each having a first communications port for operatively communicating with the master controller and a second communications port for serially communicating with one or more peripheral devices. The peripheral devices are connected together in a serial daisy chain configuration. The master controller communicates with the input/output controllers via a multidrop RS-485 network bus. The master controller also communicates with the general purpose computer via a RS-232 serial bus, so that the master controller performs protocol management functions including conversion between RS-232 and RS-485 protocol, error correction and detection, bus arbitration and data buffering.

Preferably, the network includes a general purpose computer having a serial communications port. The computer is capable of running applications software for controlling a point-of-sale system. Each I/O controller unit preferably includes a limited number of peripheral device interface ports, to which one or more point-of-sale peripheral devices are operatively connected.

According to the present invention, each I/O controller is capable of supporting a plurality of peripheral devices interconnected by a serial daisy chain expansion technique which allows peripheral devices to be freely integrated with or removed from the system without the need for reconfiguring or rebooting the system. Each input peripheral device preferably includes an electronic interface, operatively connecting the input device to the serial peripheral device bus, which converts the serial data format of a particular input device into a data format compatible with the I/O controller. The interface monitors the peripheral device bus to determine when the bus is available for transmitting data and is able to selectively disconnect input devices from the bus that are located further away from the I/O controller (i.e., downstream).

In one embodiment, the present invention is configured as a Kitchen System. In the Kitchen System embodiment, one or more input/output controllers include an indicating device, such as a buzzer, or a visual or tactile indicating device. The I/O controller also includes a display, such as a video monitor. The I/O controller's input/output peripheral device is preferably a bump bar.

These and other purposes, goals and advantages of the present invention will become apparent from the following detailed description of illustrative embodiments thereof, which is to be read in connection with the accompanying drawings.

DETAILED DESCRIPTION OF THE PREFERRED EMBODIMENTS

Figure 1:
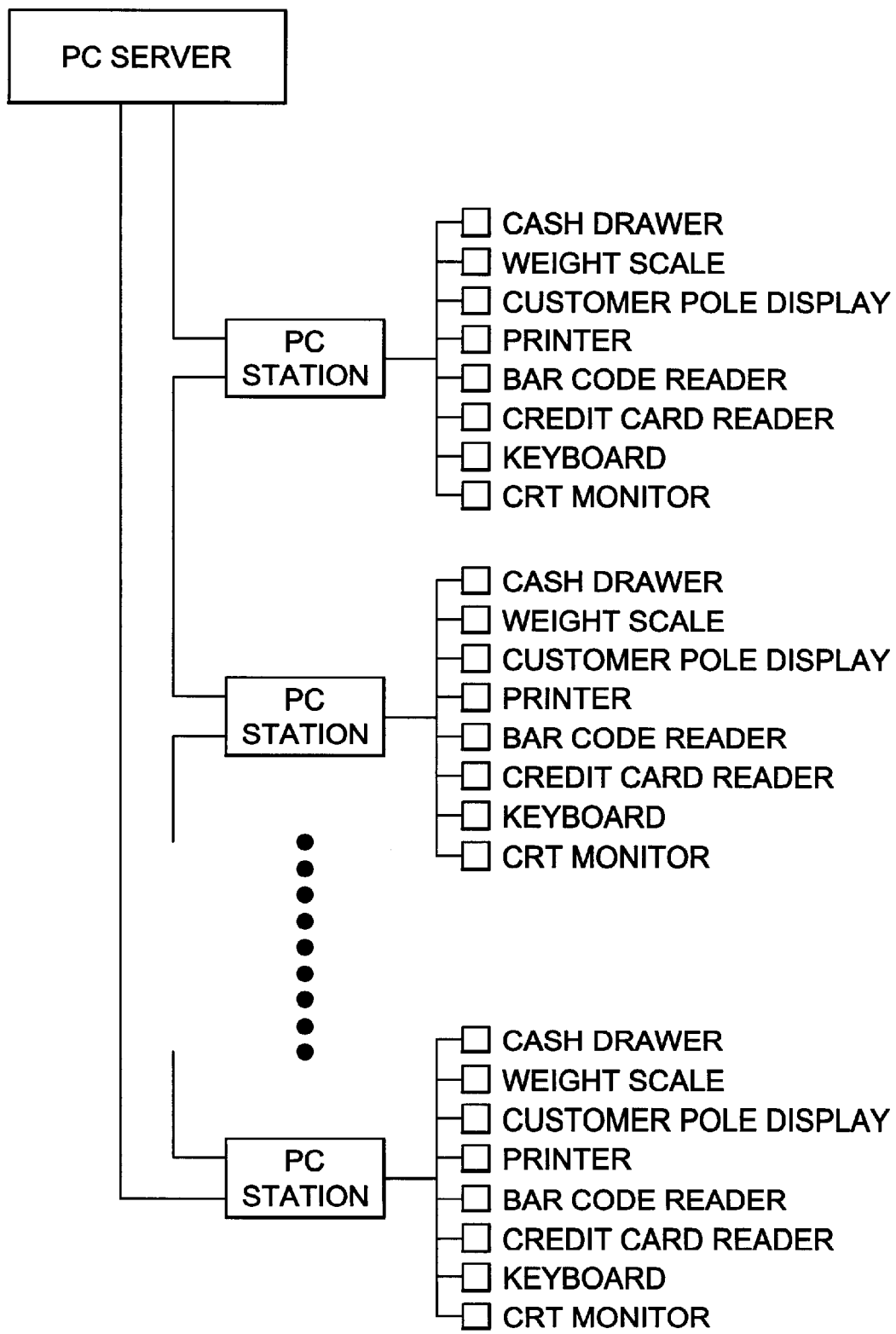
FIG. 1 is a block diagram of a PC based computer network known in the prior art.
Figure 2:
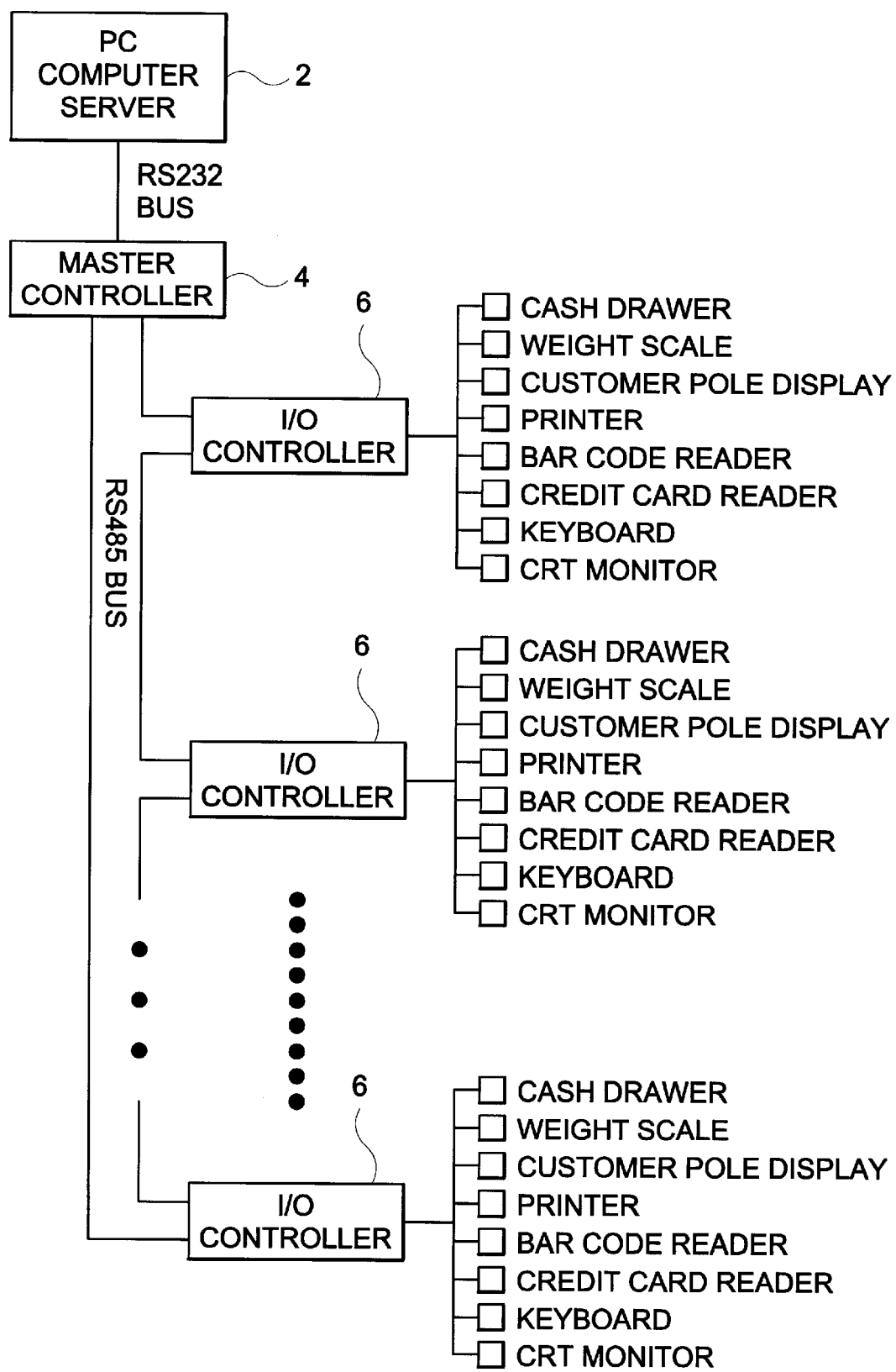
FIG. 2 is a block diagram of a distributed computer network topology formed in accordance with the present invention.

FIG. 1 represents a typical prior art distributed computer network having a plurality of personal computer (PC) stations directly connected via a common data bus to a personal computer network server. The disadvantages associated with this topology have been discussed above. FIG. 2 generally illustrates a block diagram of a distributed computer network formed in accordance with the present invention. Referring to FIG. 2, the computer network includes a conventional computer network server 2 which is capable of running applications software for overall control of the point-of-sale system. The server 2 preferably takes the form of a conventional personal computer, such as that manufactured by IBM or an equivalent thereof. The server 2 communicates with the distributed computer network via a serial communications port, preferably an RS-232 port, integrated with the server 2.

The distributed computer network of the present invention further includes a master controller 4, preferably hardware based. The master controller 4 functions as an interface node for the distributed computer network, communicating with the server 2 and receiving instructions therefrom. Preferably, the master controller 4 is interfaced to the server 2 via an RS-232 communications link. The master controller 4 preferably converts the received serial communications from the server 2 into a multipoint communications protocol, which is also referred to as multidrop communications protocol; preferably an RS-485 protocol, for distribution along the network. As an alternative, other serial communication formats known by those skilled in the art may be employed and the master controller 4 will perform the conversion from the serial protocol used to communicate with the server 2 to the protocol used to communicate with the other nodes of the computer network.

The master controller 4 further performs protocol management functions including error detection/correction, data bus arbitration, data buffering, and hardware peripheral driver. By employing these functions in the master controller 4, rather than in the server 2, the server 2 is liberated from performing burdensome communications network control tasks and can therefore operate in a faster, more efficient manner. Using this approach in an RS-485 system, for example, serial data communications or higher data rates of 115,200 baud or higher can be achieved.

Figure 3:
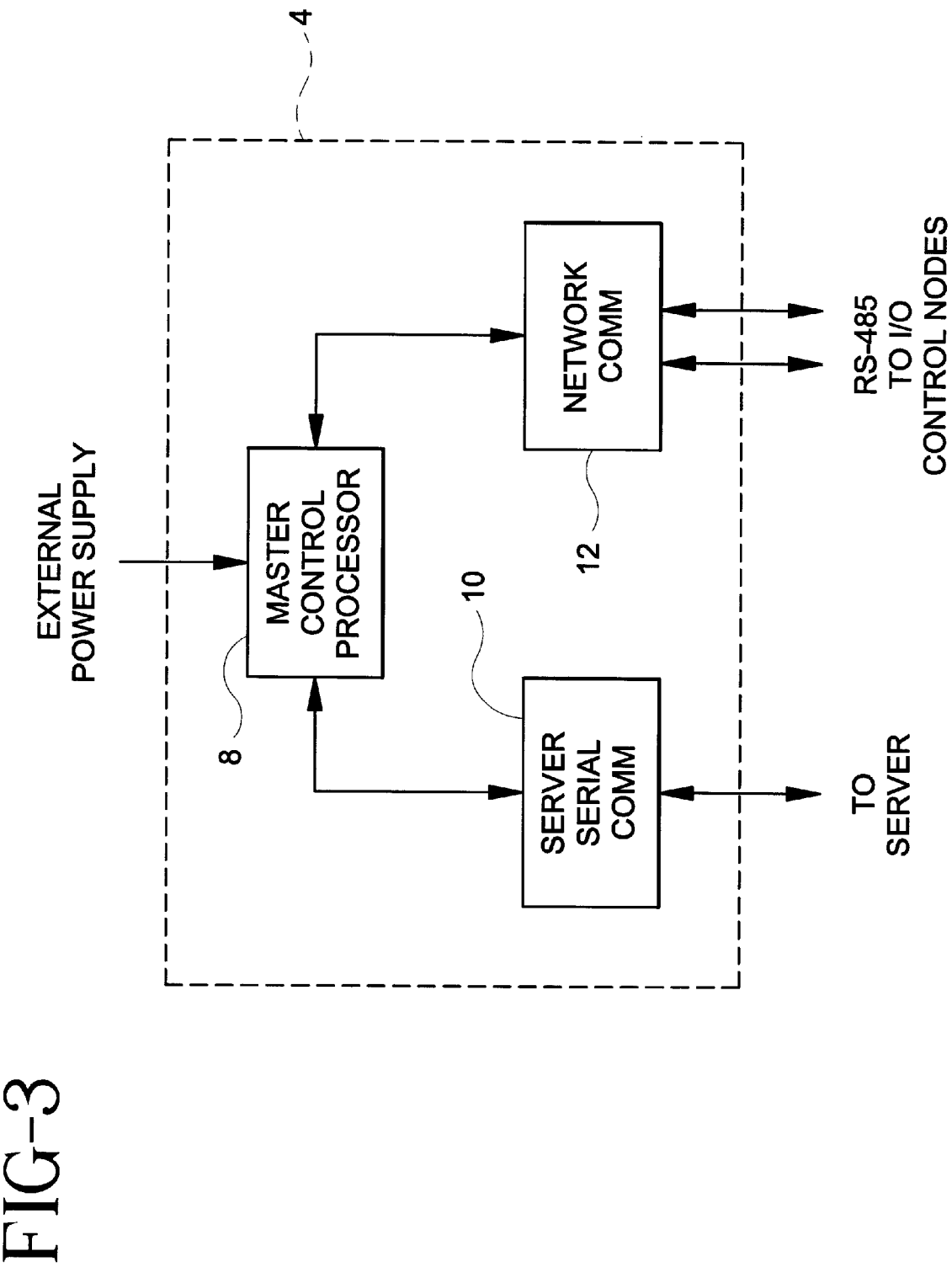
FIG. 3 is a block diagram of a master controller formed in accordance with the present invention.
Figure 4A:
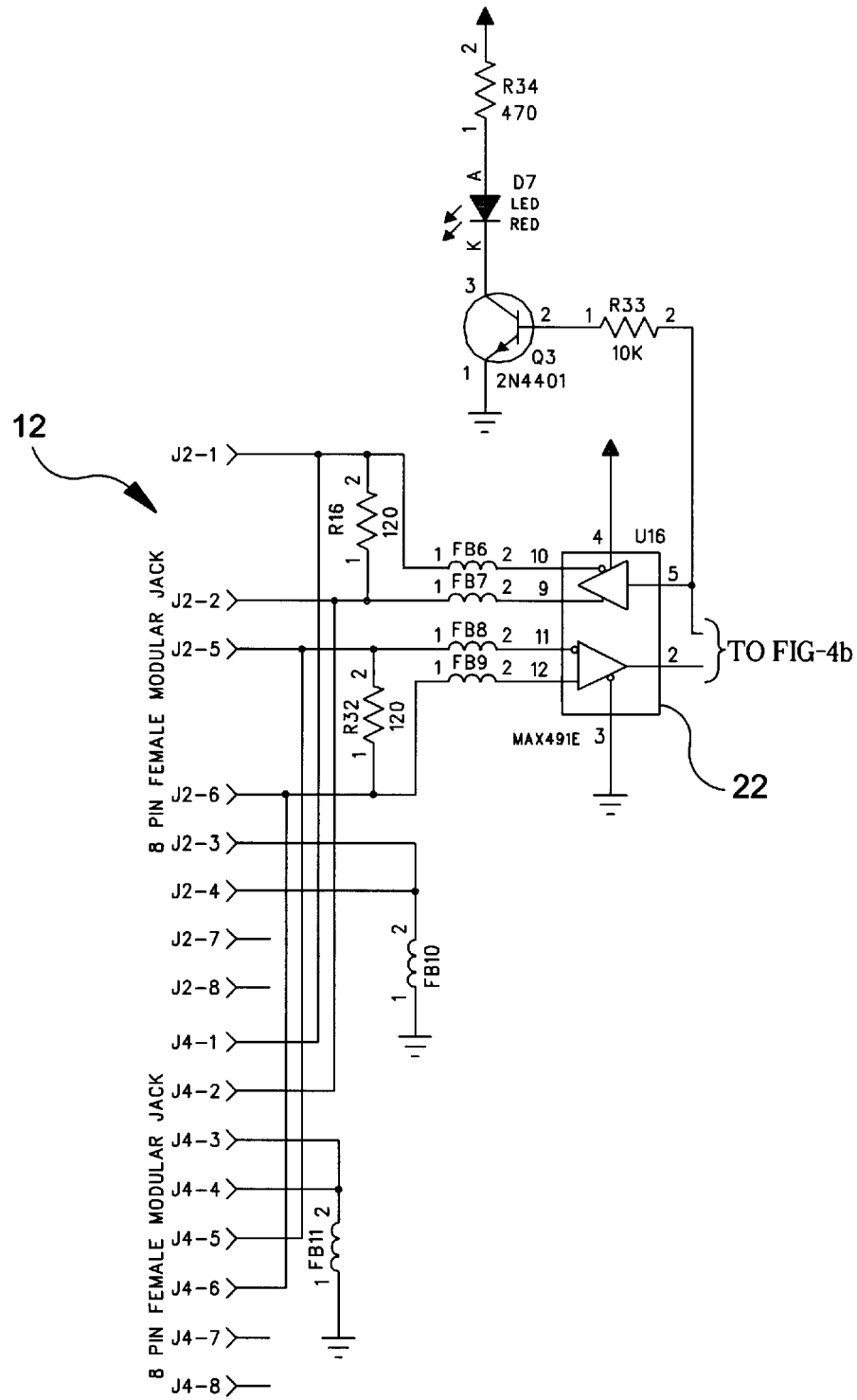
FIG. 4 is an electrical schematic diagram of an exemplary master controller circuit, formed in accordance with the present invention and depicted by the block diagram of FIG. 3.
Figure 4B:
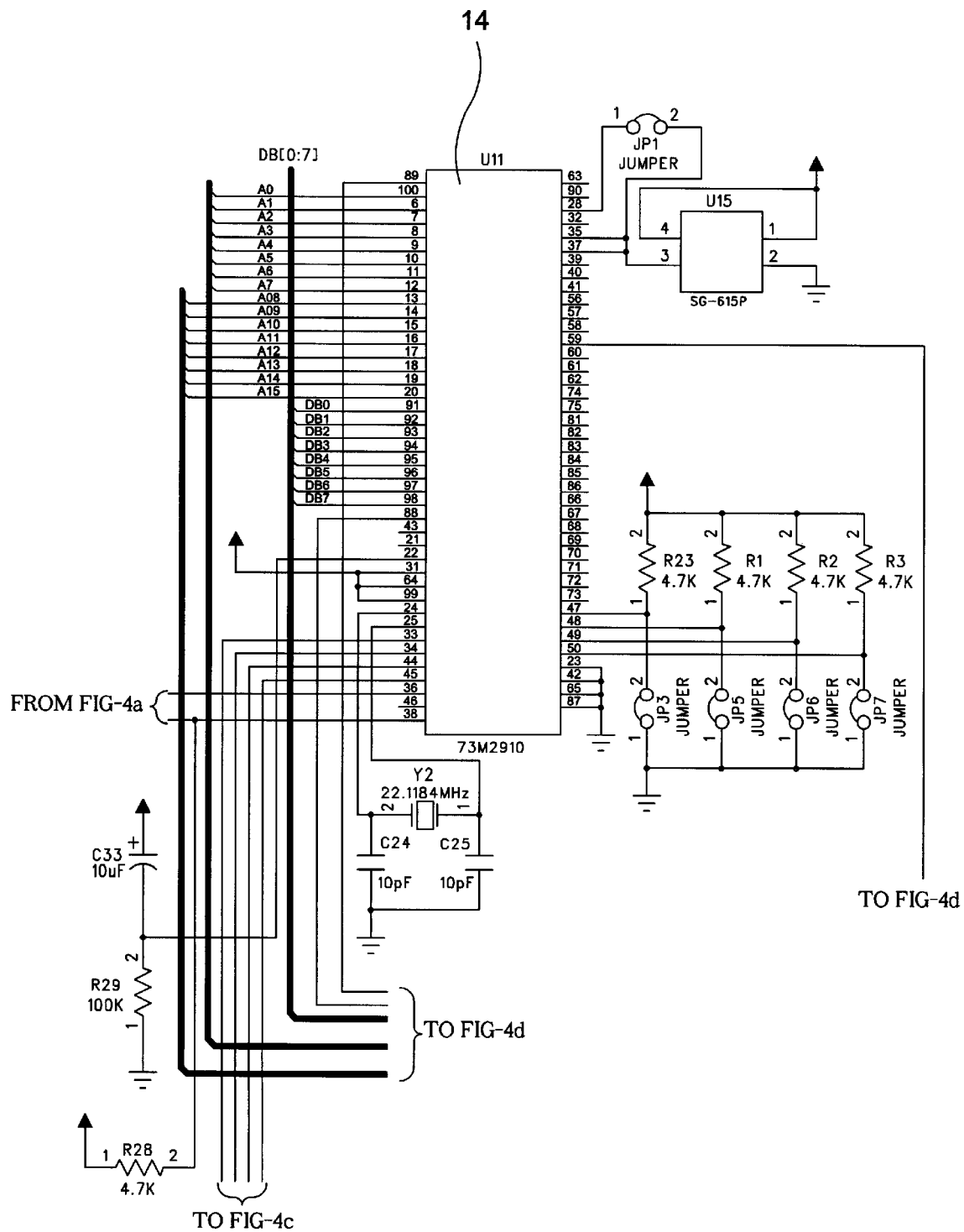
Figure 4C:
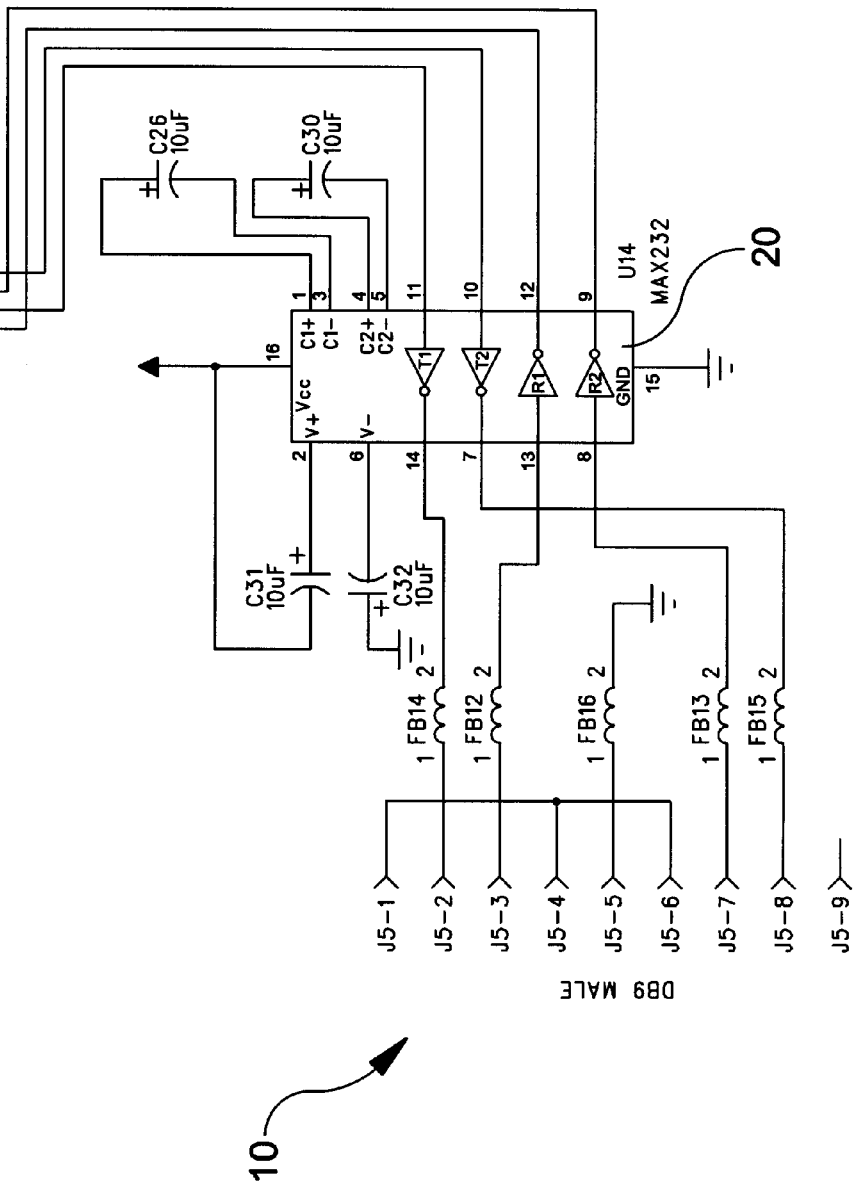
Figure 4D:
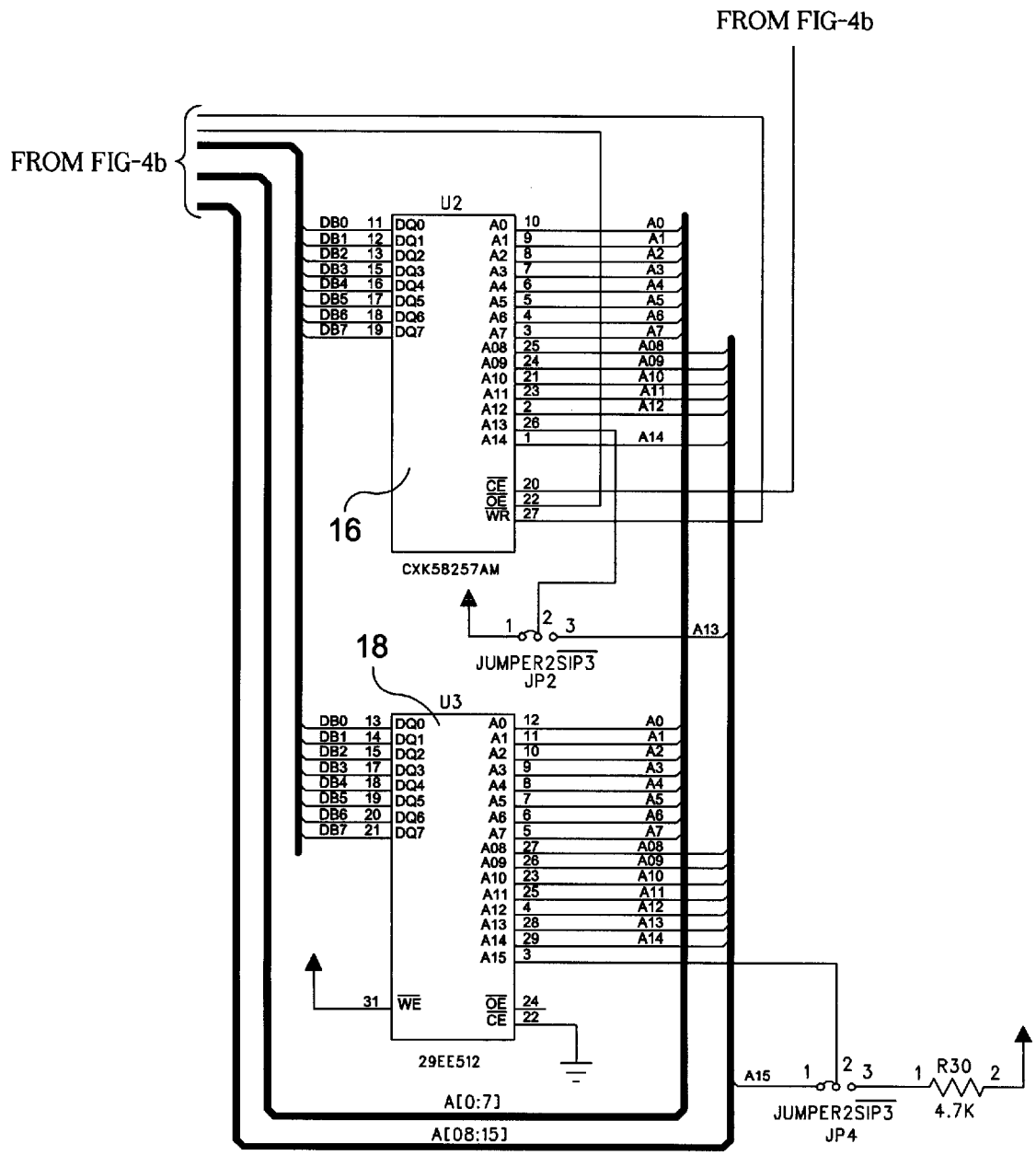
Figure 4E:
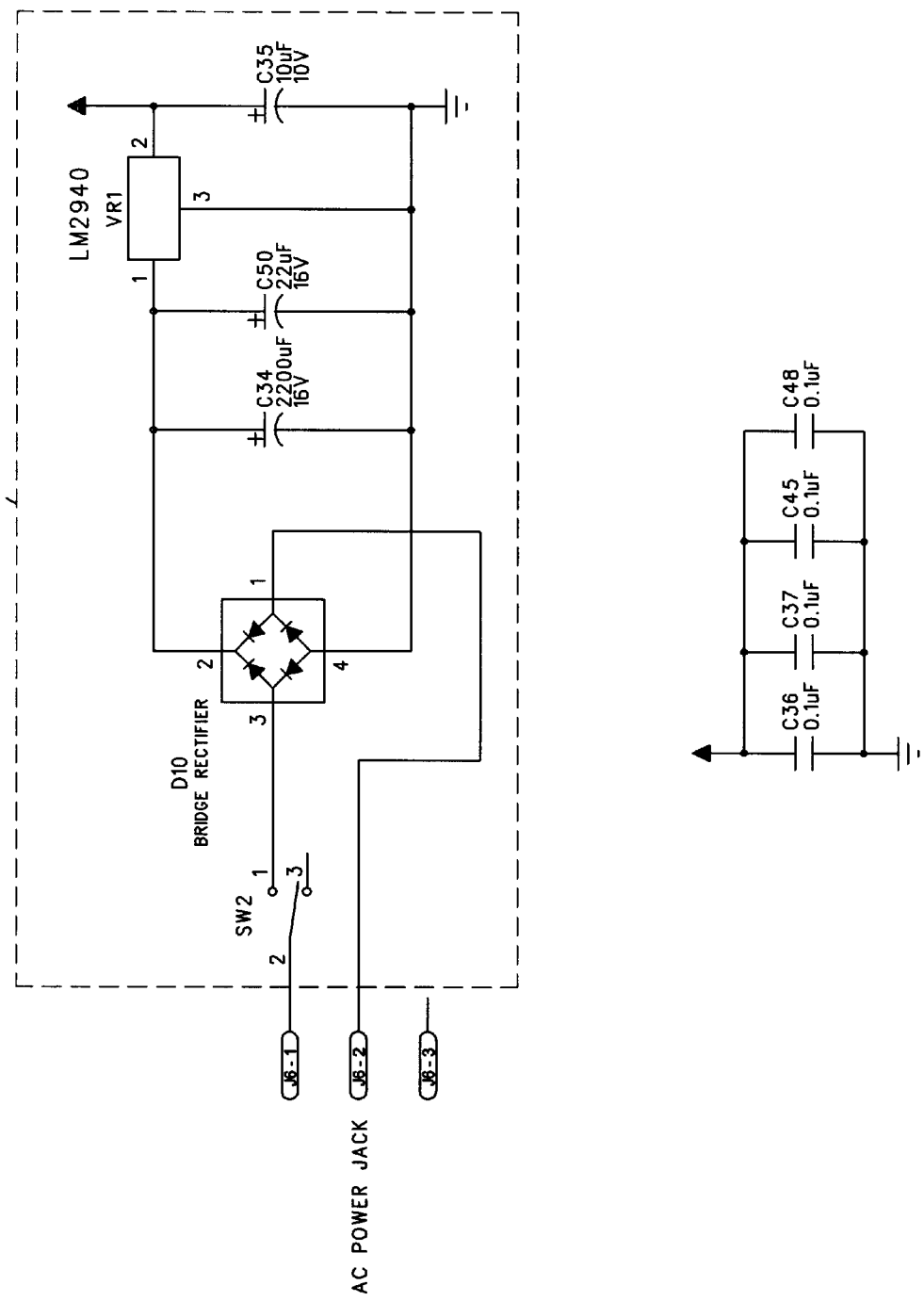

Referring to the block diagram of FIG. 3, a preferred embodiment of the master controller 4 is shown including a master control processor 8, a server communications port 10 and a network communications port 12. The master control processor 8 performs the bulk of the protocol management tasks described above, including control of data traffic between the server communications port 10 and the network communications port 12. The server communications port 10 provides an interface between the server 2 and the master control processor 8. As previously discussed, the server communications port 10 preferably exchanges data with the server 2 via a serial RS-232 link, although other similar data communications protocols are contemplated. The network communications port 12 similarly provides an interface between the master control processor 8 and the multidrop network, preferably an RS-485 bus.

An exemplary master controller circuit 4, formed in accordance with the present invention, is illustrated in the electrical schematic diagram of FIG. 4. The circuit includes a microprocessor 14 which, together with a programmable read-only memory (PROM) 18, a random access memory (RAM) 16 and related peripheral components, functions as the master control processor 8. Preferably, the PROM 18 is a 512K electrically erasable PROM (EEPROM), such as industry part number 29EE512 or equivalent, and is operatively connected to the microprocessor 14 via common address and data buses.

The EEPROM 18 stores the application program instructions to be executed by the microprocessor 14 and is preferably field programmable to facilitate system updates. Additionally, the RAM module 16 is preferably a 256K static RAM, such as Sony part number CXK58257AM or equivalent, and is preferably connected to the microprocessor 14 in a similar manner for providing data storage and retrieval space. It will be clear to those skilled in the art that a number of microprocessor circuits and architectures which are suitable for use with the present invention may be employed and are generally well known. For example, the text *Microprocessors and Microprocessor-Based System Design*, by Mohamed Rafiquzzaman (CRC Press, 1990) provides a detailed discussion of various microprocessor circuits and topologies.

The master controller circuit 4 further includes a serial RS-232 transceiver 20, such as Maxim Products part number MAX232 or equivalent, functioning as the server communications port 10 of the master controller unit. The RS-232 transceiver 20 is operatively connected to the microprocessor 14 and provides a data transfer interface between the server and the microprocessor 14. Additionally, a multidrop RS-485 transceiver 22, such as Maxim Products part number MAX491E or equivalent, functions as the network communications port 12 of the master controller unit. The RS-485 transceiver 22 is similarly connected to the microprocessor 14 and provides an interface between the multidrop network bus and the microprocessor 14.

Preferably, the master controller circuit 4 includes an internal power supply 21. The power supply 21 preferably provides a source of regulated DC voltage, suitable to meet the requirements of the master controller circuit 4. It is additionally contemplated that the power supply 21 may supply power to other system components that are connected to one of the communications ports 10, 12 of the master controller 4, thus reducing the number of external power supplies required.

Referring again to FIG. 2, the distributed computer network of the present invention further includes one or more input/output (I/O) controller nodes 6. Preferably, the I/O controller nodes 6 are interconnected through a multidrop RS-485 communications connection with data inputs and data outputs interconnected to form a serial chain. As an alternative, other network topologies, which are known in the prior art, may also be employed to provide data interconnection between each of the I/O controller nodes 6 and the master controller 4.

Figure 5:
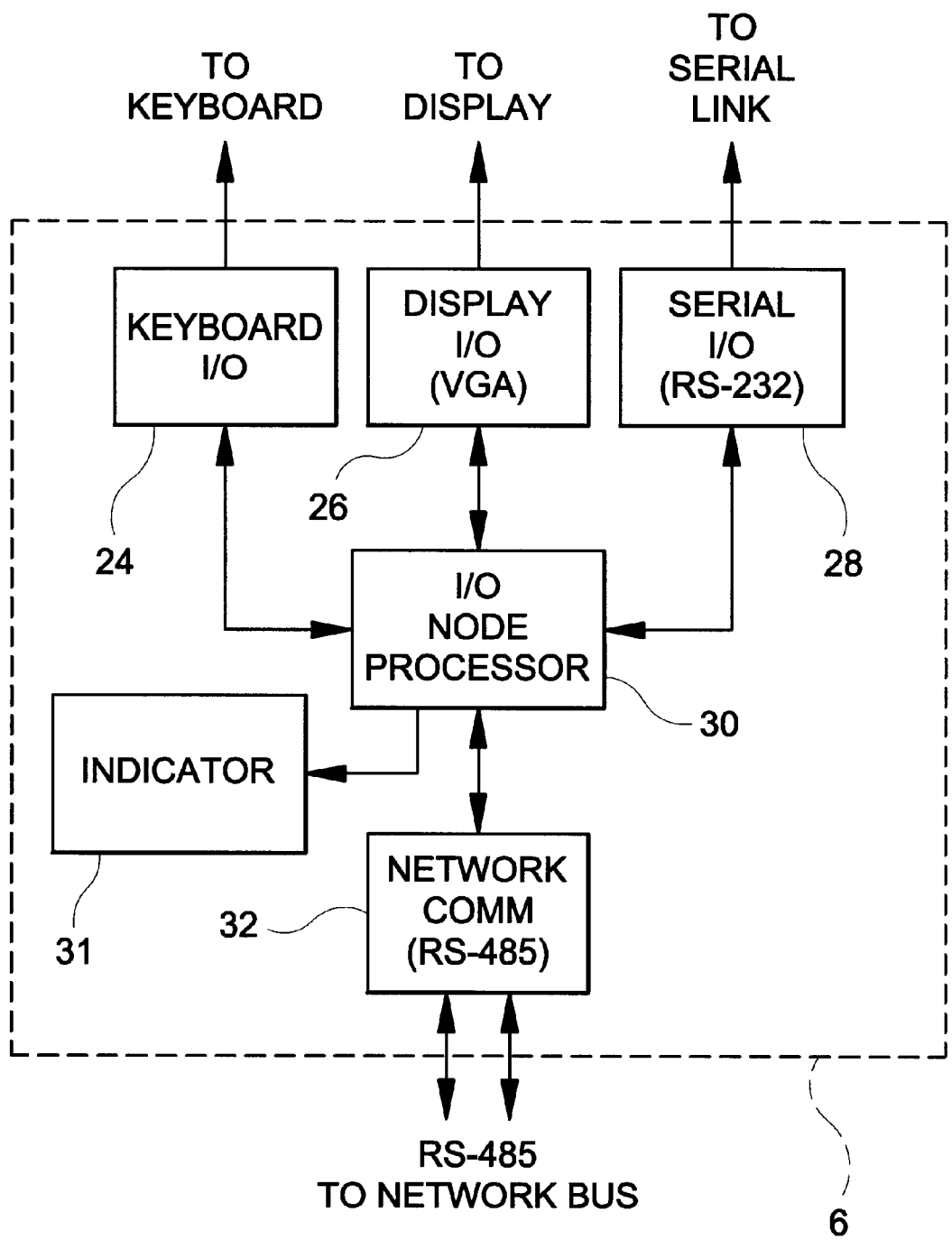
FIG. 5 is a block diagram of an input/output controller formed in accordance with the present invention.
Figure 6A:
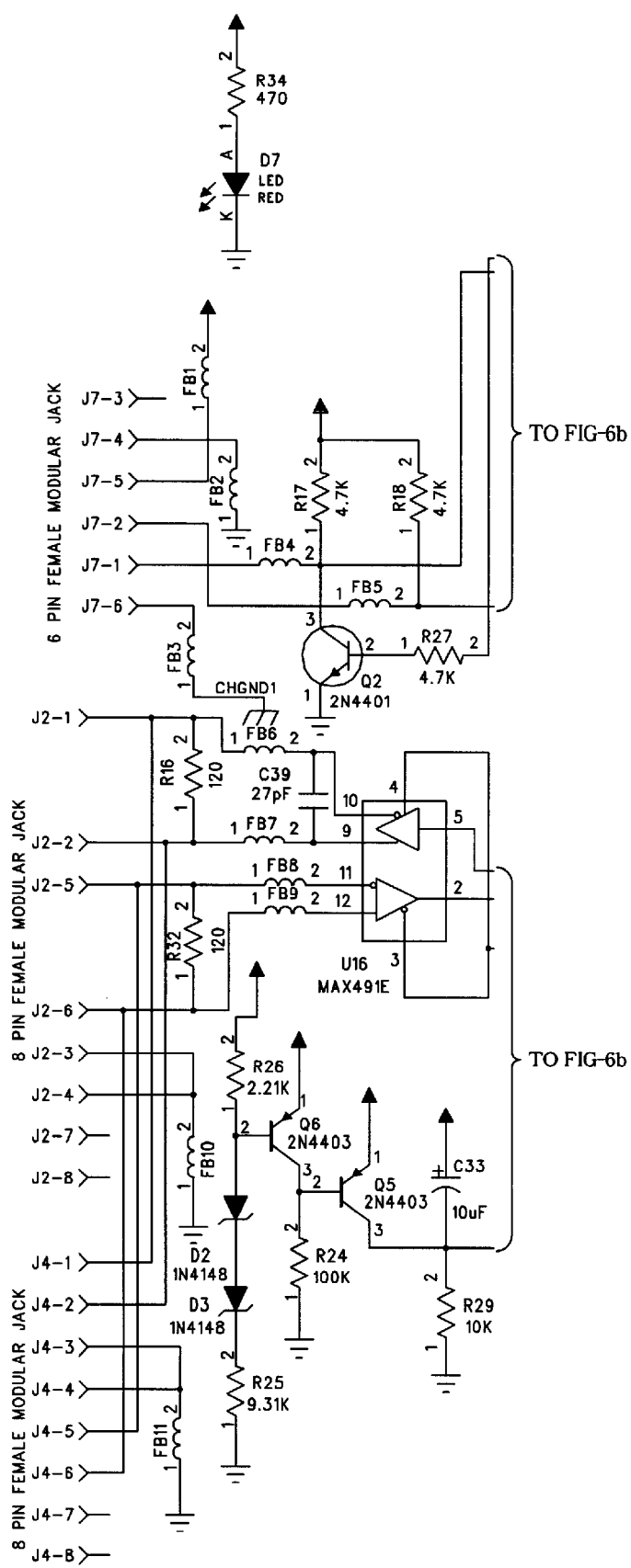
FIG. 6 is an electrical schematic diagram of an exemplary input/output controller circuit, formed in accordance with the present invention and depicted by the block diagram of FIG. 5.
Figure 6B:
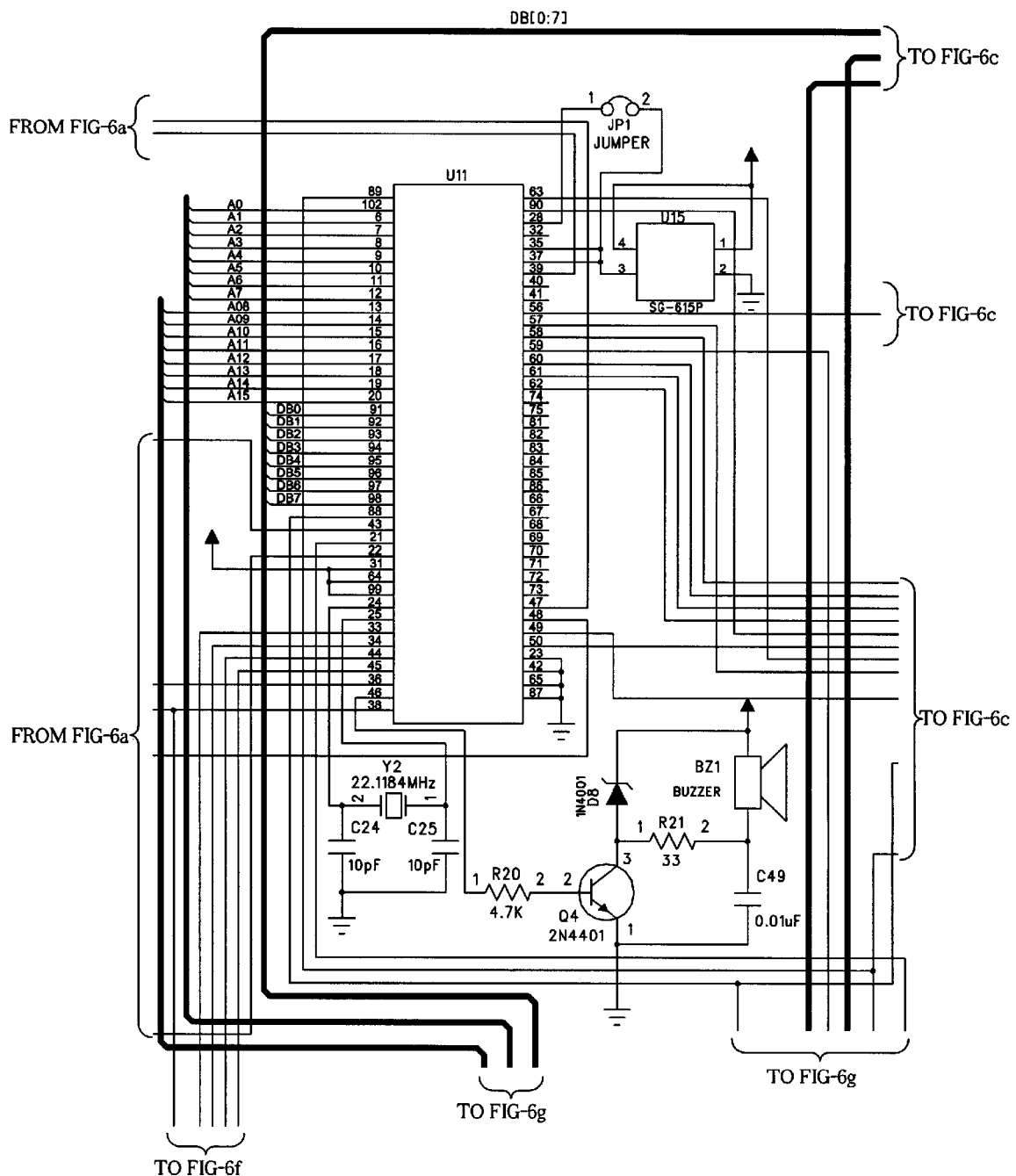
Figure 6C:
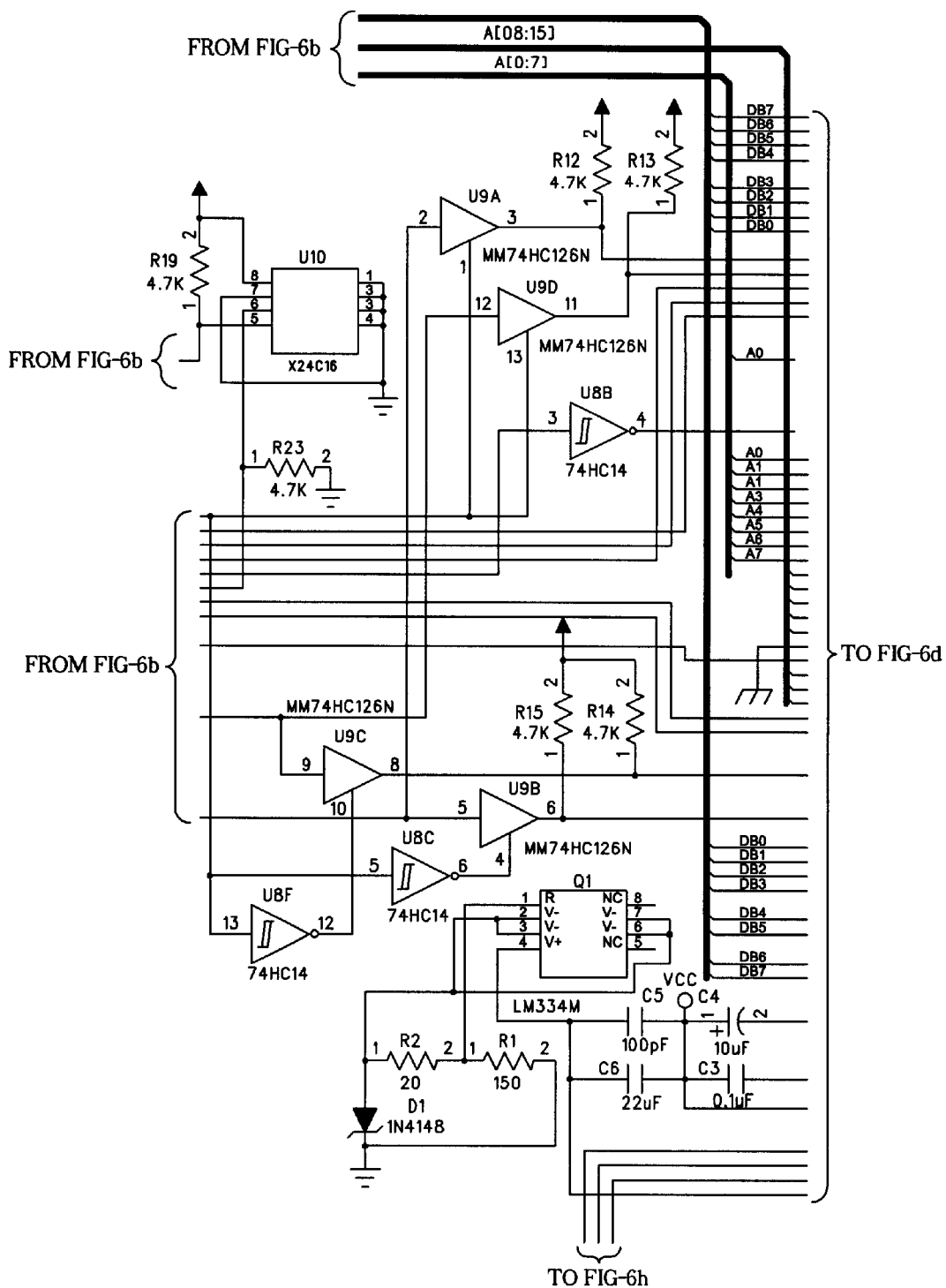
Figure 6D:
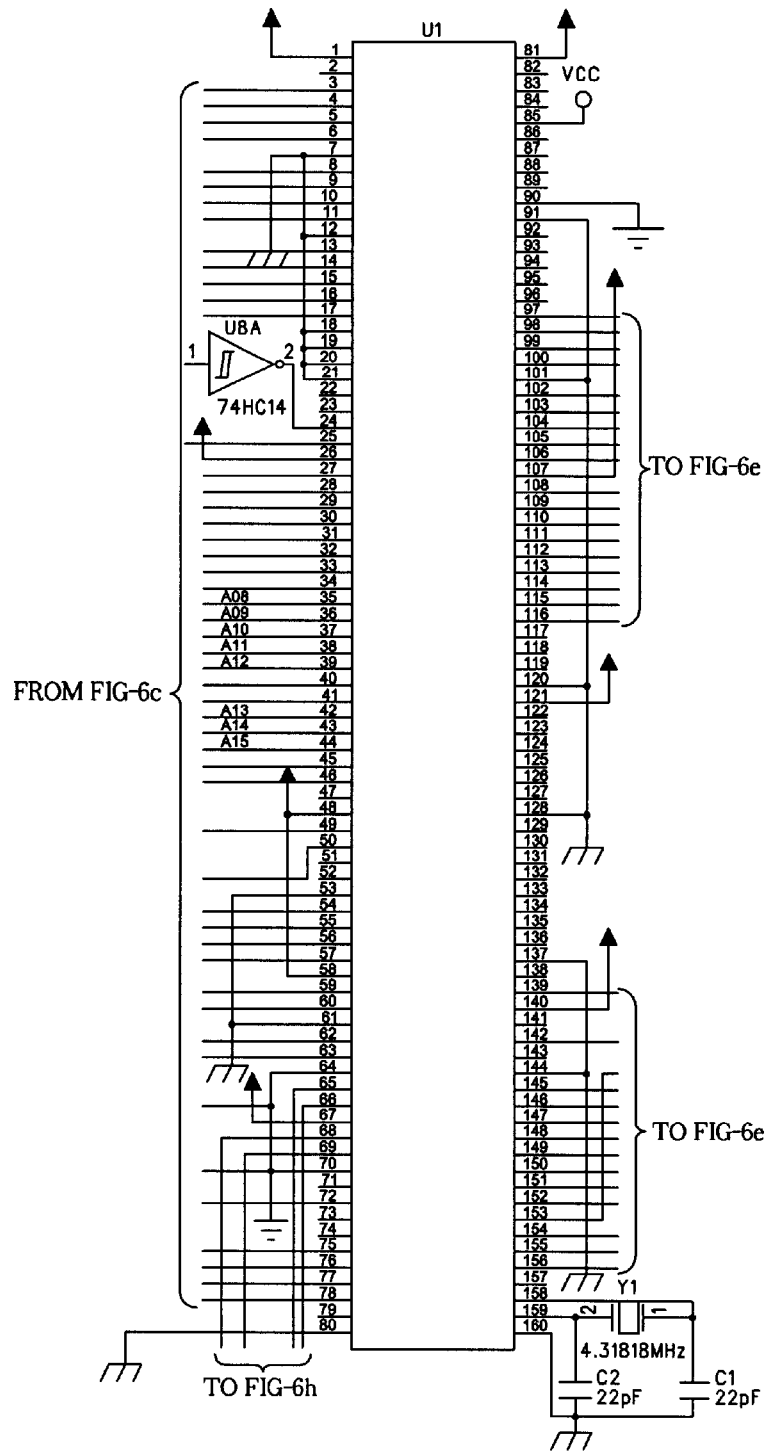
Figure 6F:
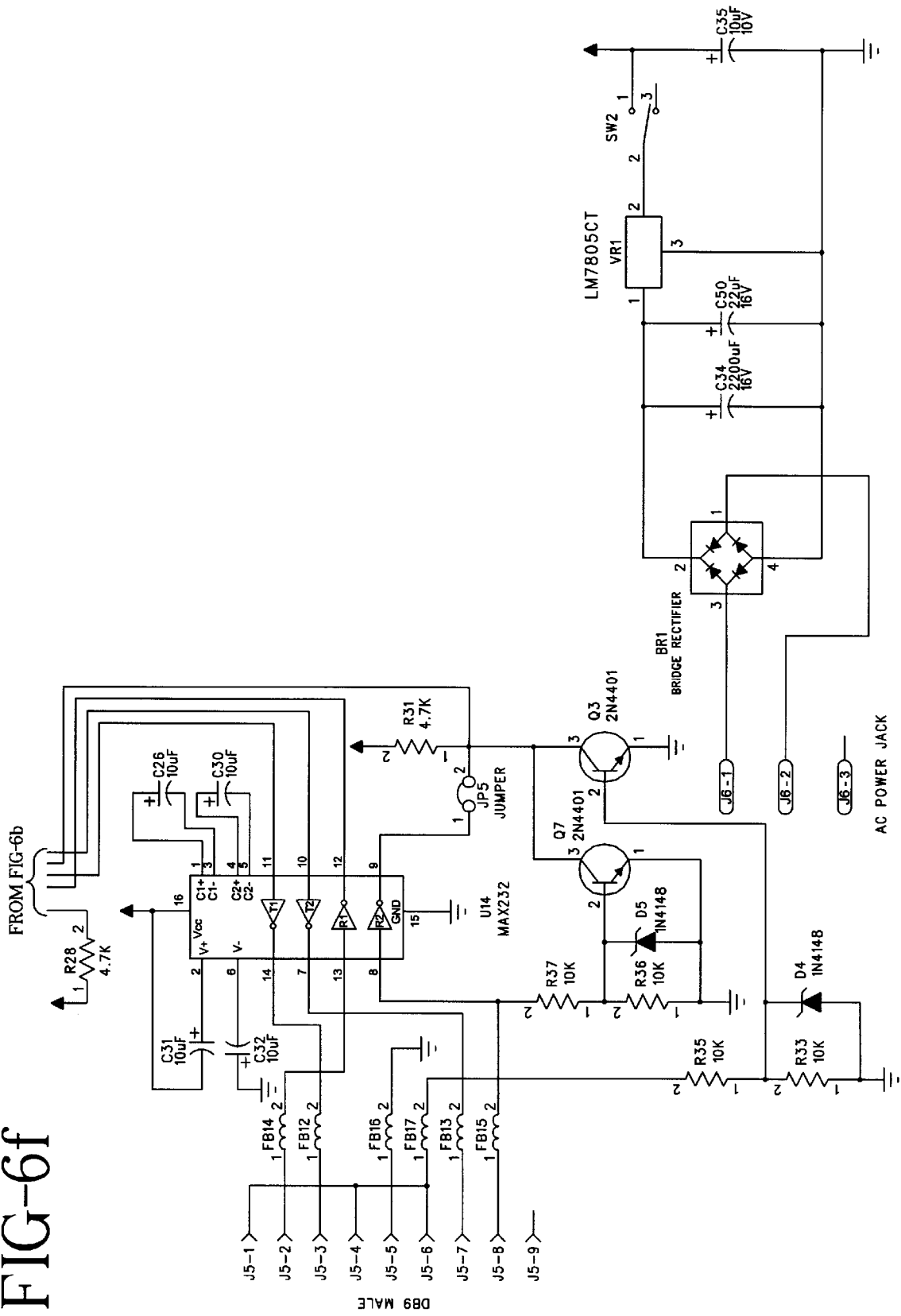
Figure 6G:
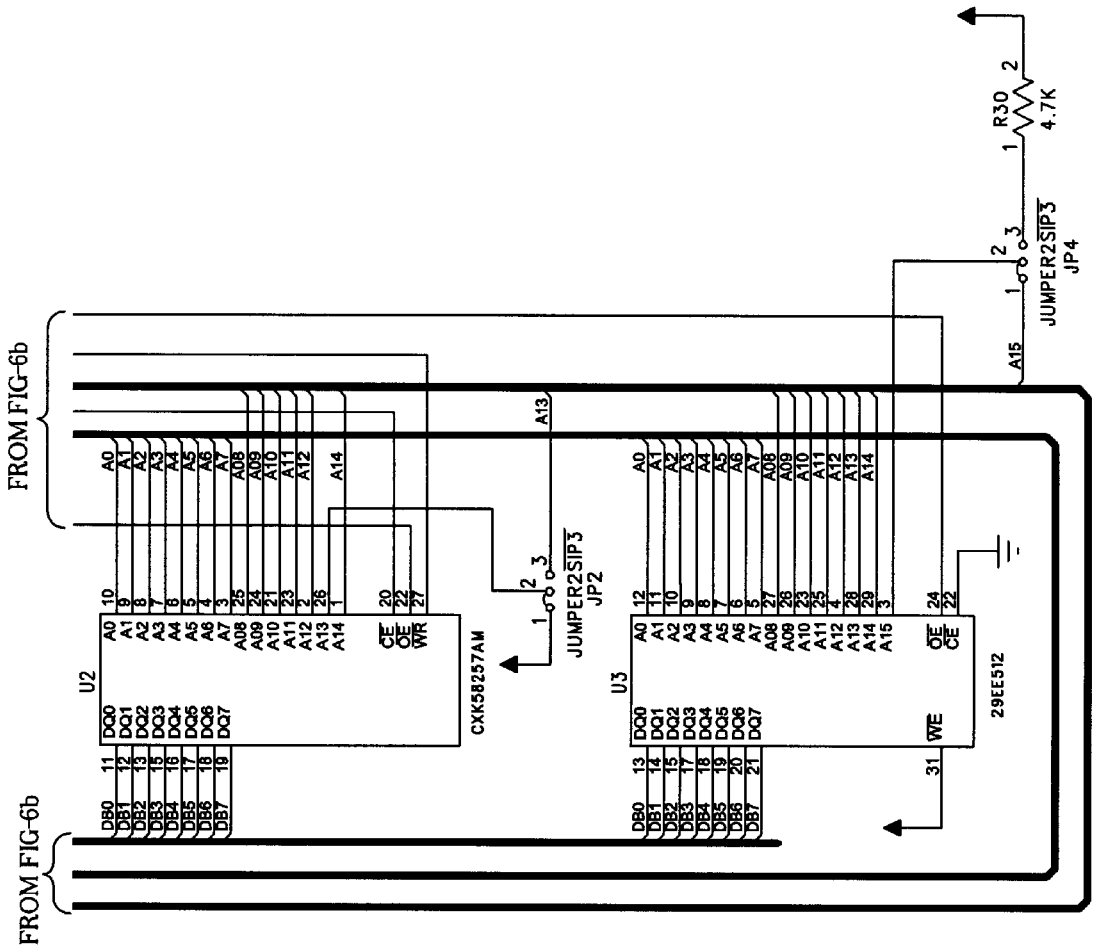
Figure 6H:
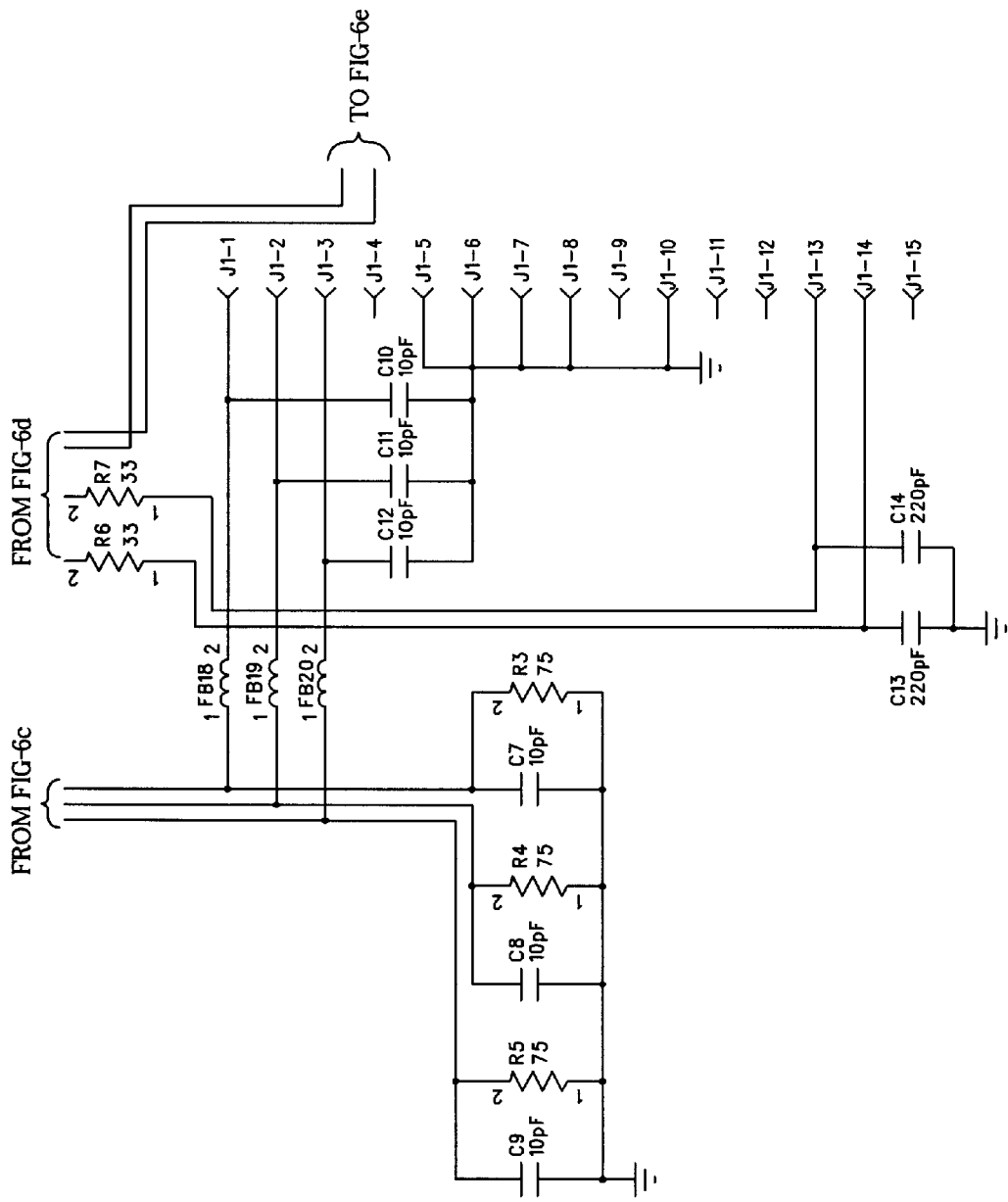
Figure 6I:
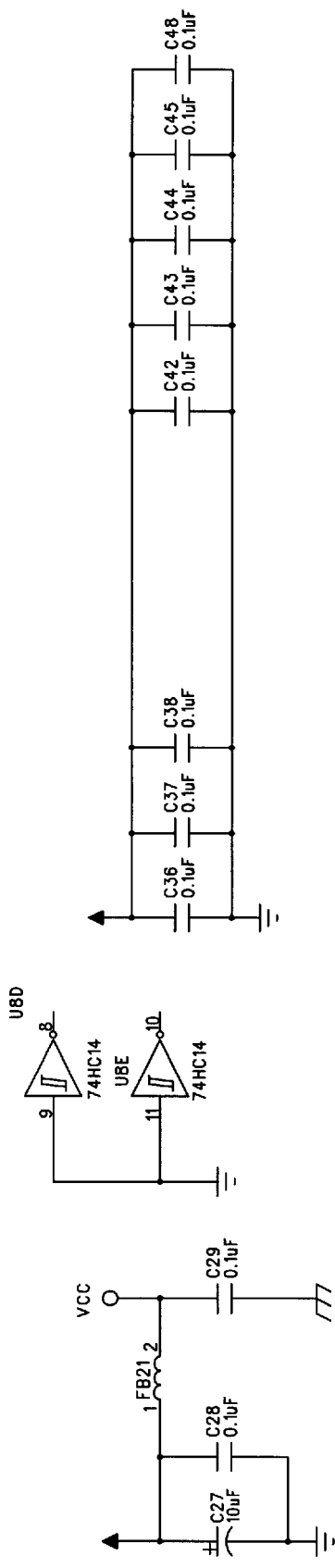

Referring to the block diagram of FIG. 5, a preferred embodiment of an I/O controller 6 formed in accordance with the present invention is illustrated. The I/O controller 6 preferably performs local network management functions, including receiving and transmitting data between the multidrop network bus and the peripheral device(s) and translation of commands originating from the application software to peripheral device controls.

Preferably, the I/O controller 6 includes a hardware interface 32 for communicating with the RS-485 bus. The I/O controller 6 further includes an input/output (I/O) node processor 30 for controlling the functions of the I/O controller 6. Preferably, the I/O controller 6 includes limited peripheral device interfaces, including a keyboard interface 24, a video display interface 26 and a serial communications I/O interface 28. The I/O node processor 30 preferably communicates with the point-of-sale peripheral devices previously described through the serial I/O interface 28 and/or keyboard interface 24. Additionally, the I/O controller preferably includes an indicator 31. The indicator 31 may be a visual device (e.g., a light), an audible device (e.g., a bell or buzzer), or a tactile device (e.g., a vibrating element), for indicating that the I/O controller has received data from the master controller.

Since the point-of-sale peripherals include integral processing to control their own functions, the I/O node processor 30 of the I/O controller 6 need only contain enough processing capability to perform network interface functions and peripheral communications control functions. This significantly reduces the processing burden on the I/O node processor 30 and allows simplification in the design of these components.

An exemplary I/O controller circuit, formed in accordance with the present invention, is illustrated in the electrical schematic diagram of FIG. 6. It is to be appreciated that suitable I/O controller circuits for use with the present invention are well known by those skilled in the art and, therefore, an in-depth discussion of the I/O controller circuit will not be presented here.

One embodiment of a point-of-sale system formed in accordance with the present invention is shown in FIG. 6. This system is virtually identical to the system shown in FIG. 2, except that each I/O controller 6 is shown having a point-of-sale peripheral device 7 attached thereto. An example of the point-of-sale system of FIG. 6, adapted for use in a restaurant or similar food establishment, is currently being commercially sold by IBM under the product name "IBM Kitchen System."

The Kitchen System is a completely open system that attaches easily to any PC-based computer using an RS-232 port. Included in the IBM Kitchen System is a master controller and one or more I/O units. Attached to each I/O unit is a "bump bar," preferably connected directly to a keyboard port of the I/O unit. The bump bar serves as a special keyboard device capable of providing the codes to move ("bump") items previously displayed on a video monitor. The video monitor, preferably a VGA or Super VGA monitor or equivalent, is connected directly to the video port of the I/O unit. The Kitchen System preferably supports up to sixteen I/O units, with each I/O unit supporting a bump bar and a video monitor. Additionally, an external power supply may be provided to meet the power requirements of the point-of-sale system. Firmware controlling the operation of the I/O unit is preferably field programmable, to facilitate system updates and provide enhanced system flexibility.

In a preferred embodiment of the present invention, each I/O controller is preferably capable of supporting a plurality of point-of-sale peripheral devices by employing the communications and peripheral expansion technique illustrated and described in U.S. patent application Ser. No. 08/011,461 (now abandoned), filed on Jan. 26, 1993 by the same inventor as in the present application. This prior application is incorporated herein by reference.

Figure 7:
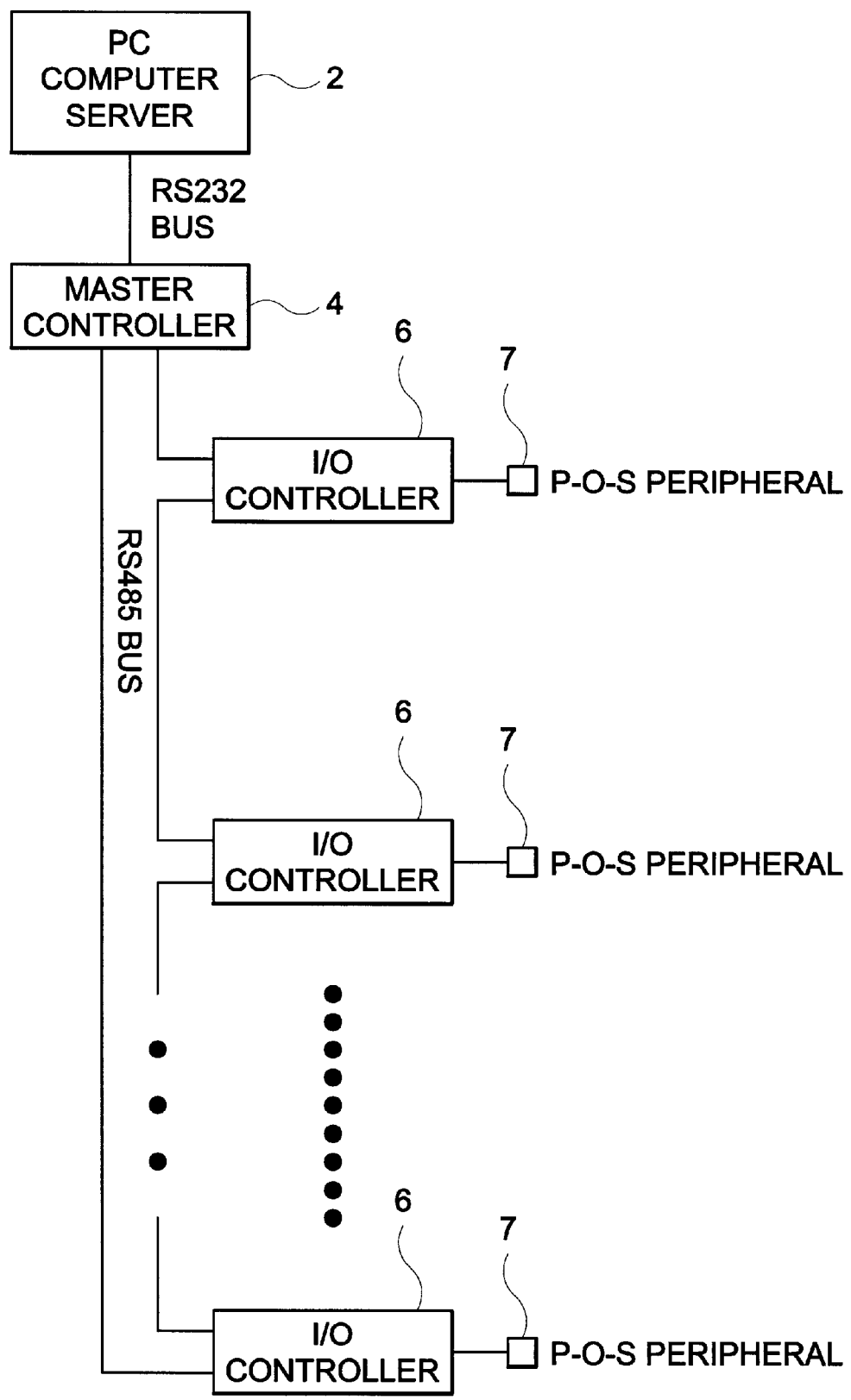
FIG. 7 is a block diagram of one embodiment of a point-of-sale system formed in accordance with the present invention.

Referring now to FIG. 7, there is shown a prior art system for interconnecting point-of-sale peripherals to a personal computer (PC) station (see FIG. 1). Using this technique, a separate interface card is required for each peripheral device. Thus, the number of devices that a particular PC station can support is limited by the number of slots available within the PC station to receive interface cards. Furthermore, adding or removing interface cards requires partial disassembly of the computer, reconfiguring the software and re-booting the system, thereby increasing system down-time.

Figure 8:
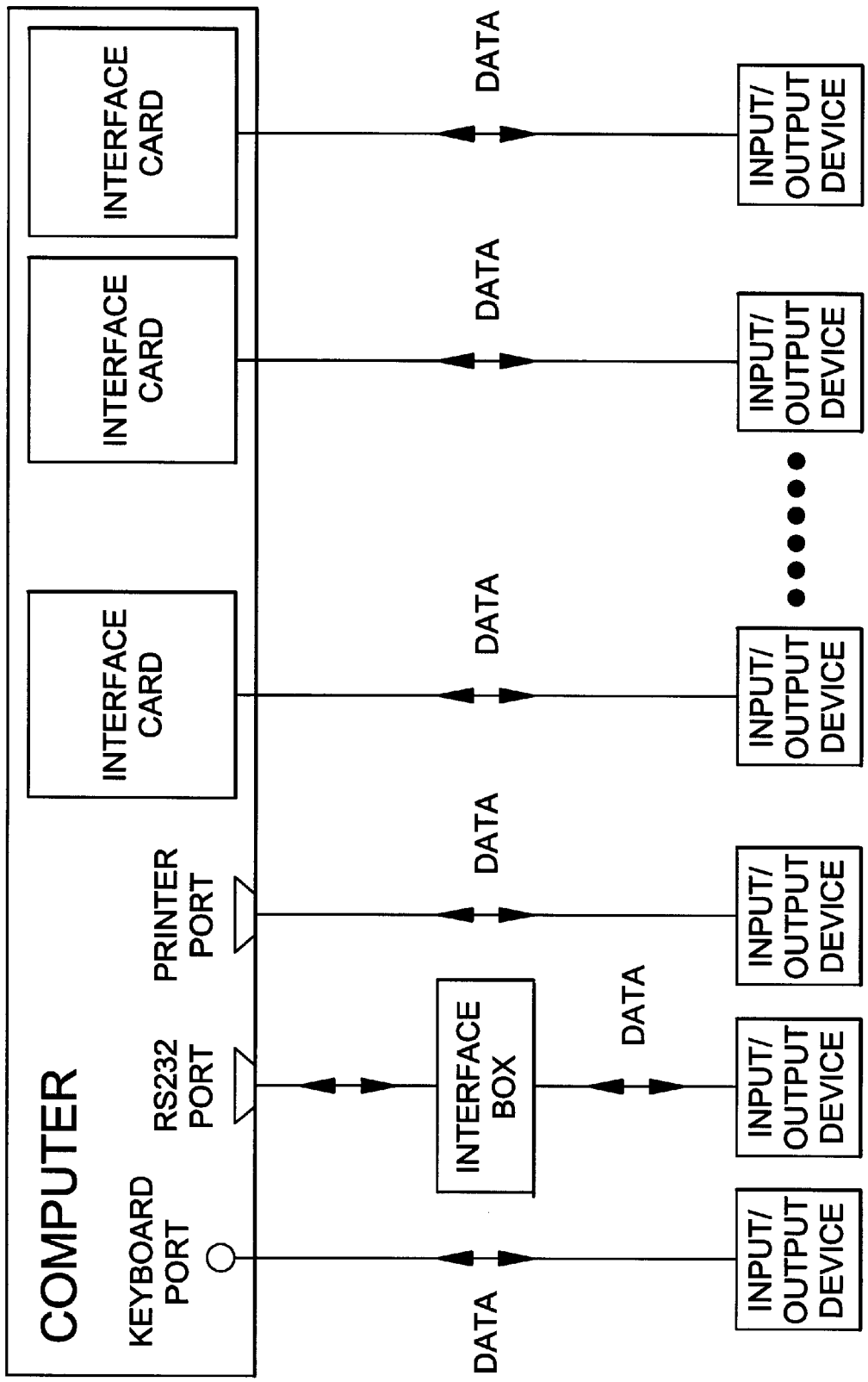
FIG. 8 is a block diagram of a point-of-sale peripheral device interconnection arrangement known in the prior art.

In FIG. 8, there is shown a peripheral expansion technique, according to the present invention, wherein input peripheral devices 40 (e.g., bar code reader, POS keypad, electronic weight scale, magnetic stripe reader, etc.) are preferably connected to the keyboard port 34 of the I/O controller 6 in a serial, daisy chain configuration and output peripheral devices 38 (e.g., pole display, video monitor, printer, etc.) are preferably connected to the serial port 36 of the I/O controller 6. Using this approach, no special I/O interface card nor special computer is required. Additionally, only two I/O ports, namely, a keyboard port 34 and a serial port 36, are used to support many peripheral devices. The input peripheral devices can be freely integrated with or removed from the system simply by coupling or uncoupling their respective cables.

In the keyboard chain of devices, an RS-232 input peripheral device 40 (or other peripheral device which does not output data in keyboard format) may be incorporated into the point-of-sale system by preferably using an intelligent keyboard wedge interface which converts the serial data format of the input device 40 into standard keyboard data format. Generally, the physical location of the input peripheral devices is not critical. However, since the conventional 101-key computer keyboard has no wedge interface (since its output is already in standard keyboard data format), it is preferably connected as the last component in the chain of devices. The wedge interface may be part of the device cable connection (i.e., external to the input peripheral device 40) or it may alternatively be integrated within the input device 40, as illustrated in FIG. 9.

Figure 9:
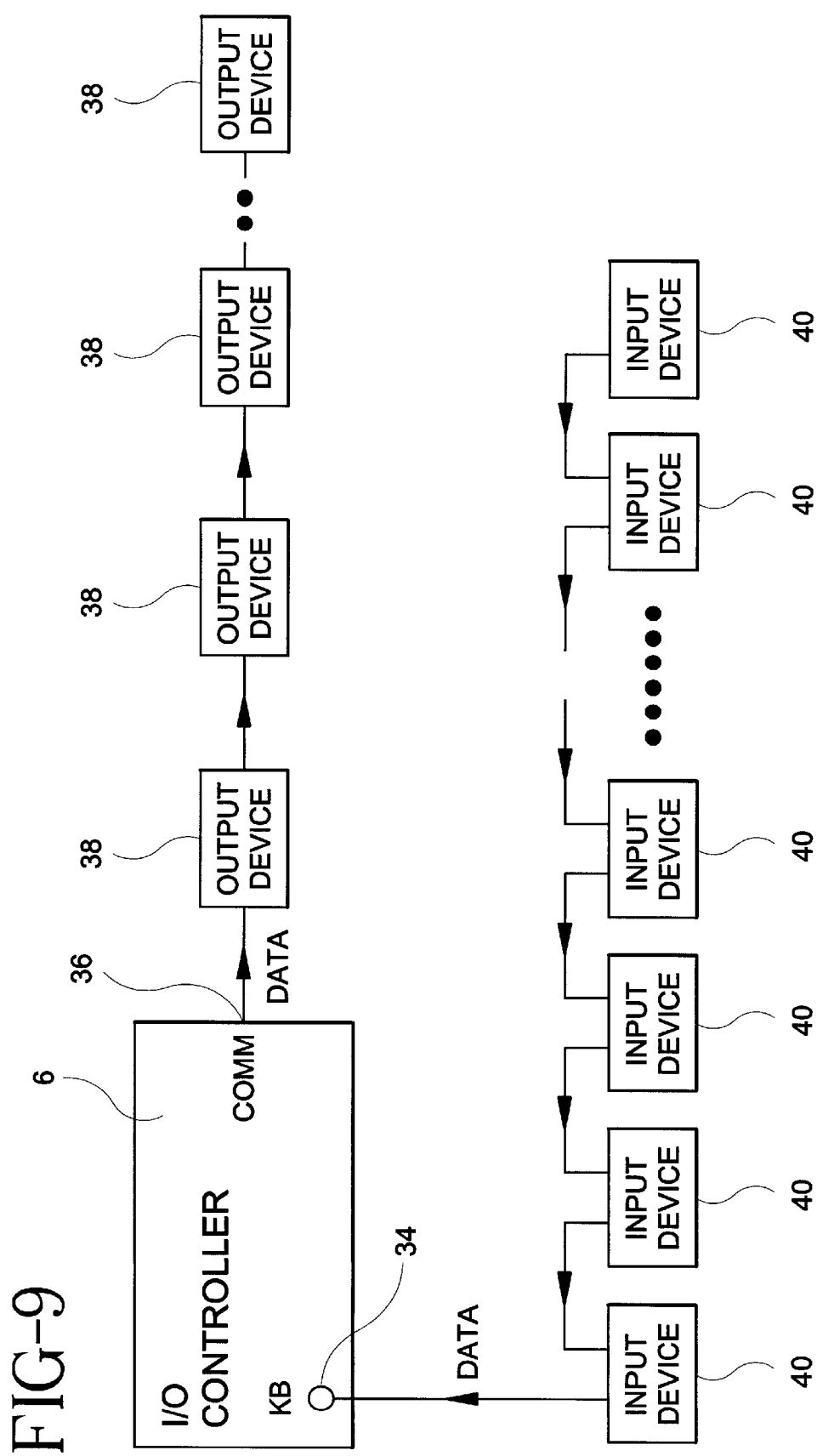
FIG. 9 is a block diagram of a point-of-sale peripheral device interconnection topology formed in accordance with the present invention.

Referring now to FIG. 9, the wedge interface circuit is shown functionally as including a pair of switches 42 and an interface control circuit 44. The switches 42 may either be in a pass-through state (default) or may be in a transmit state. When an input peripheral device 40 has no data available for transmission, the switches 42 will be in the default pass-through state (as shown in FIG. 9). As the name suggests, an input device 40 configured with the switches 42 in the pass-through state basically functions as a conduit through which data may freely pass, thereby allowing other input peripheral devices to communicate directly with the I/O controller. When the switches 42 are in the transmit state, all downstream devices which are connected to the particular input device 40 (i.e., those input devices that are connected further away from the I/O controller in the keyboard daisy chain) are electrically disconnected from the data bus and the input device 40 is enabled for communication with the I/O controller.

If an input peripheral device 40 has data to be transmitted to the I/O controller, the interface will first monitor the traffic on the data bus to determine if another input device is presently communicating with the I/O controller. Preferably, only one input device 40 may communicate with the I/O controller at any given time, thus avoiding bus contention problems which may otherwise occur. Therefore, when one input device is communicating with the I/O controller, all other input devices will preferably monitor the bus and maintain their pass-through configuration, regardless of whether or not they have data to transmit.

When the bus is available for transmission (i.e., a break has been detected), the interface control circuit 44 of the input peripheral device 40 will change the state of the switches 42 so as to electrically disconnect the downstream input devices from the data bus, thereby allowing the input device 40 to transmit its data to the I/O controller. While transmitting its data, the upstream input devices (i.e., those peripheral devices that are connected closer to the I/O controller in the serial keyboard daisy chain) monitor the bus and maintain their pass-through state. After the input device 40 has completed its data transmission, the interface control circuit 44 changes the state of the switches 42 back to the default pass-through state.

If an input peripheral device 40 has data to be transmitted to the I/O controller and the data bus is busy, the interface control circuit 44 will preferably store the data from the input device 40, for example in memory, until a break is detected on the bus. Once the bus becomes available, the stored data from the interface control circuit 44 is subsequently transmitted to the I/O controller in the manner described above. If an input device 40 includes multiple interfaces, each interface will preferably independently store its data and monitor the data bus until the bus is free, and then each interface will transmit its stored data in turn.

Preferably, the keyboard wedge interface performs a conversion of the data it receives from the input peripheral device 40, for example RS-232 format, into standard keyboard data format. Using this approach, all input peripheral devices will be communicating with the I/O controller in a compatible data format (i.e., keyboard data format). This eliminates the need for an I/O controller having multiple interface cards, one for each data format used.

When the interface circuit is not communicating with the I/O controller, it preferably monitors and records all activities between the keyboard and the I/O controller. For example, if the "Caps Lock" key is pressed, the interface circuit will make the proper case inversion such that the I/O controller always receives the correct characters from the input peripheral device. The interface circuit also preferably supports bidirectional dialog with the I/O controller if the standard keyboard is not present or is not functioning properly. This allows the I/O controller to function without generating a "Keyboard Error" interrupt, even if the standard keyboard and/or input peripheral devices are not installed.

Figure 10:
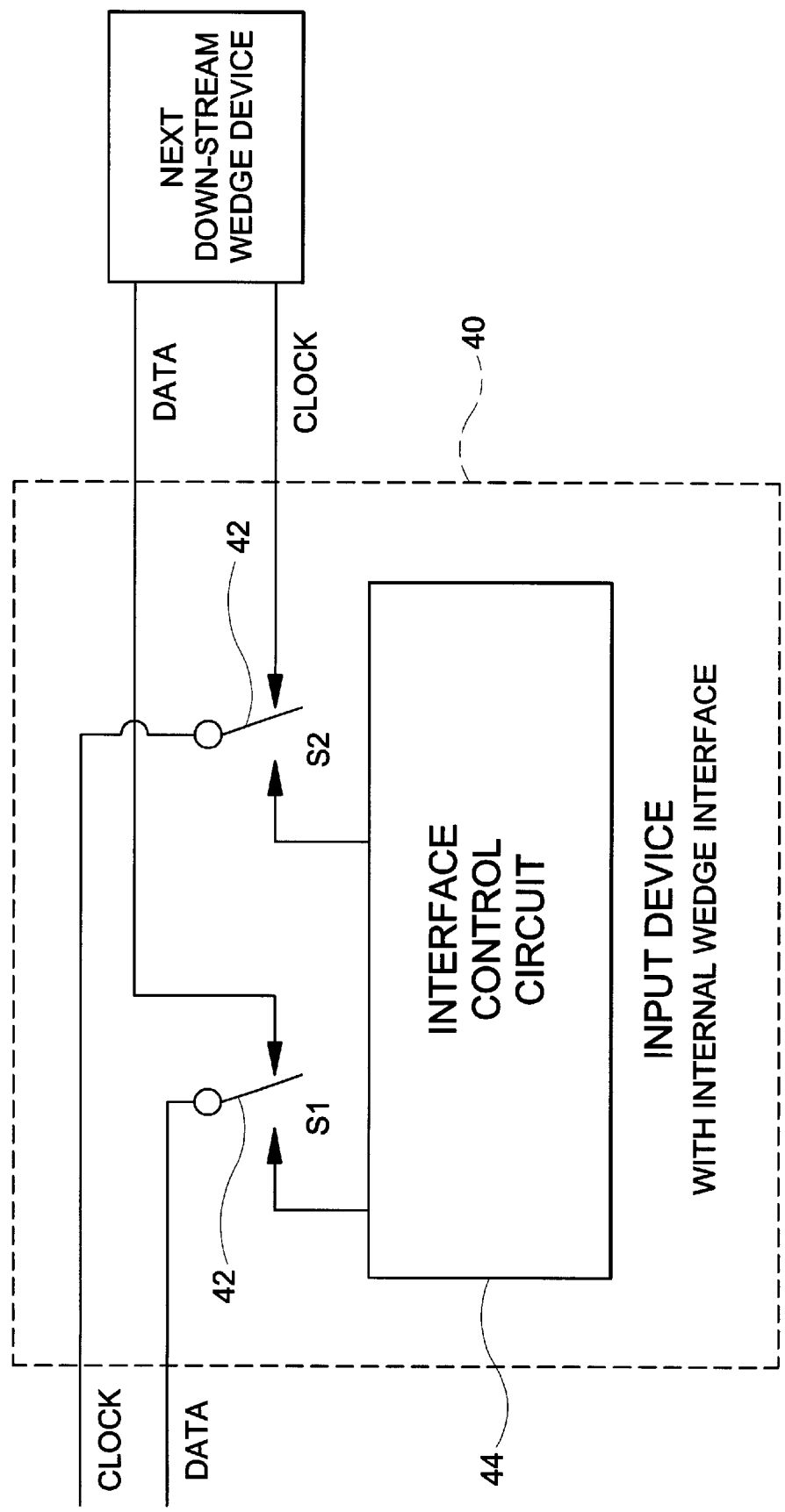
FIG. 10 is a block diagram of a wedge interface device, formed in accordance with the present invention, internally integrated with a point-of-sale input peripheral device.
Figure 11:
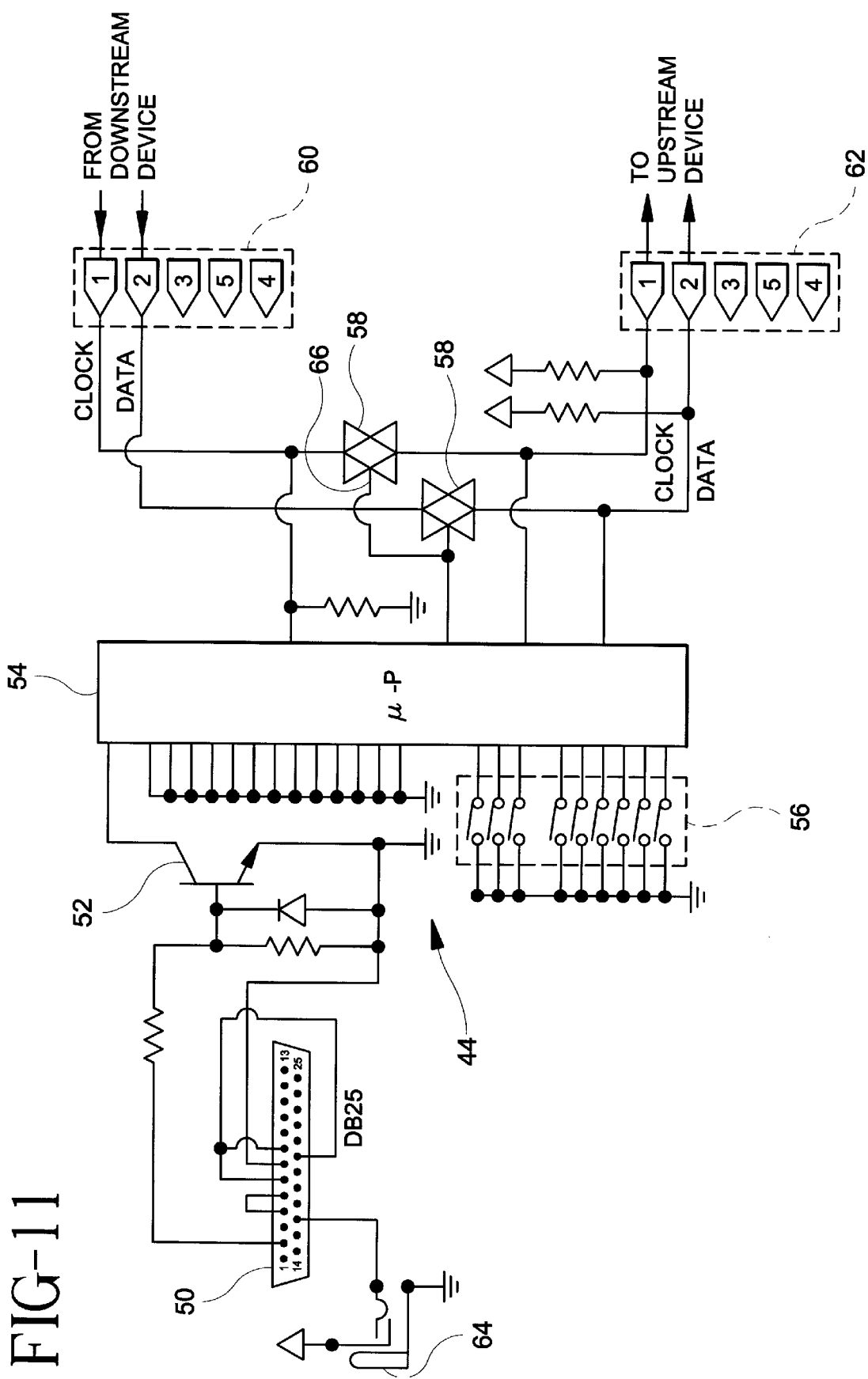
FIG. 11 is an electrical schematic diagram of an exemplary wedge interface circuit, formed in accordance with the present invention and depicted by the block diagram of FIG. 8.

The wedge interface circuit may be formed as an external unit, preferably integrated with the peripheral device cable. This cable would allow standard (i.e., off-the-shelf) point-of-sale peripheral devices that do not output data in standard keyboard format, and do not have an internal wedge interface, to be used with the POS system of the present invention, thereby keeping overall system costs down. An exemplary external wedge interface circuit, formed in accordance with the present invention, is illustrated in the electrical schematic diagram of FIG. 10. As shown in FIG. 10, the interface circuit includes a connector 50, preferably a 25-pin DB25 connector, for operatively coupling the interface circuit to the output of an input peripheral device. The circuit further includes a microprocessor or microcontroller 54, such as an 80C51 microcontroller or equivalent, for performing the required data format conversion and bus control functions previously described. Power for the interface circuit of FIG. 9 may be provided through pin 16 of connector 50 or, alternatively, external power may be provided through connector jack 64. The wedge interface circuit preferably includes connectors 60 and 62 to operatively connect the interface circuit, and therefore an input peripheral device to which the interface circuit is connected, between upstream and downstream devices in the keyboard daisy chain. Connectors 60 and 62 are preferably keyboard-type connectors, such as 5-pin DIN connectors or equivalent.

Connector 60 preferably receives data from a downstream input peripheral device which is connected thereto. Connector 62 preferably outputs data either directly from an adjacent downstream peripheral device, through connector 60 (e.g., when the interface is in a pass-through state) or from the peripheral device coupled to connector 50, after the data has been converted by the microcontroller 54 (e.g., when the interface is in a transmit state). Regardless of the state of the interface circuit, the data output from connector 62 will preferably be in a format compatible with the I/O controller port to which the chain of peripheral devices is connected.

It is to be appreciated that if the interface circuit is integrated internally with the input peripheral device, connector 50 may be eliminated and the data from the input device would preferably be directly presented to the microcontroller 54.

Before being presented to the microcontroller 54, it may first be necessary to invert the data signal from the input peripheral device (attached to connector 50) by an invertor circuit, preferably realized as a general purpose transistor 52. The microcontroller 54 can preferably be configured to accept a wide range of RS-232 protocol parameters and to operate with various attributes, as dictated by the settings of switches 56, preferably dual in-line pin (DIP) switches, operatively connected to the microcontroller 54. Such communications parameters, for example, baud rate, number of data/stop bits and parity option (on or off), may preferably be set by switches 56.

Preferably, the clock line and data line, which forms the bus interconnecting the input peripheral devices in the POS system, are respectively connected to a pair of commercially available analog multiplexers or switches 58. Each analog switch 58 has a control input terminal and is ideally the functional equivalent of a single-pole single-throw mechanical switch. The signal at the control input terminal, preferably a binary logic signal (such as zero or five volts), controls whether the switch 58 is in an "open" or "closed" state. A switch control line 66, connecting the microcontroller 54 to the control input terminals of the analog switches 58, preferably allows the microcontroller 54 to simultaneously open or close the switches 58 under program control.

Ordinarily, the microcontroller 54 preferably generates an appropriate logic signal on switch control line 66 which maintains the switches 58 in a closed state. When the analog switches 58 are closed, the interface circuit is configured as a pass-through device, thereby allowing a downstream peripheral device, coupled through connector 60, to communicate with the I/O controller (i.e., the clock and data lines of connectors 60 and 62 are respectively operatively connected together). When the analog switches 58 are opened, the device coupled to connector 60 becomes electrically disconnected from the bus and communication between the microcontroller 54 and the I/O controller can commence through connector 62. Microcontroller 54 preferably monitors the clock line from connector 60 to determine whether the data bus is available and accordingly makes the appropriate decision as to what state the analog switches 58 should be in (i.e., the pass-through state or the transmit state).

It should be appreciated that any type of peripheral device can be connected to the microcontroller 54 by proper selection of the connector 50, conversion circuit and firmware running on the microcontroller 54. Moreover, once the peripheral output data is converted to standard keyboard data format, any number of peripherals can be chained together. When another peripheral is operating, the remaining peripheral devices simply pass the data along to the I/O controller without interference. This is particularly advantageous in terms of system expansion capability.

Figure 12:
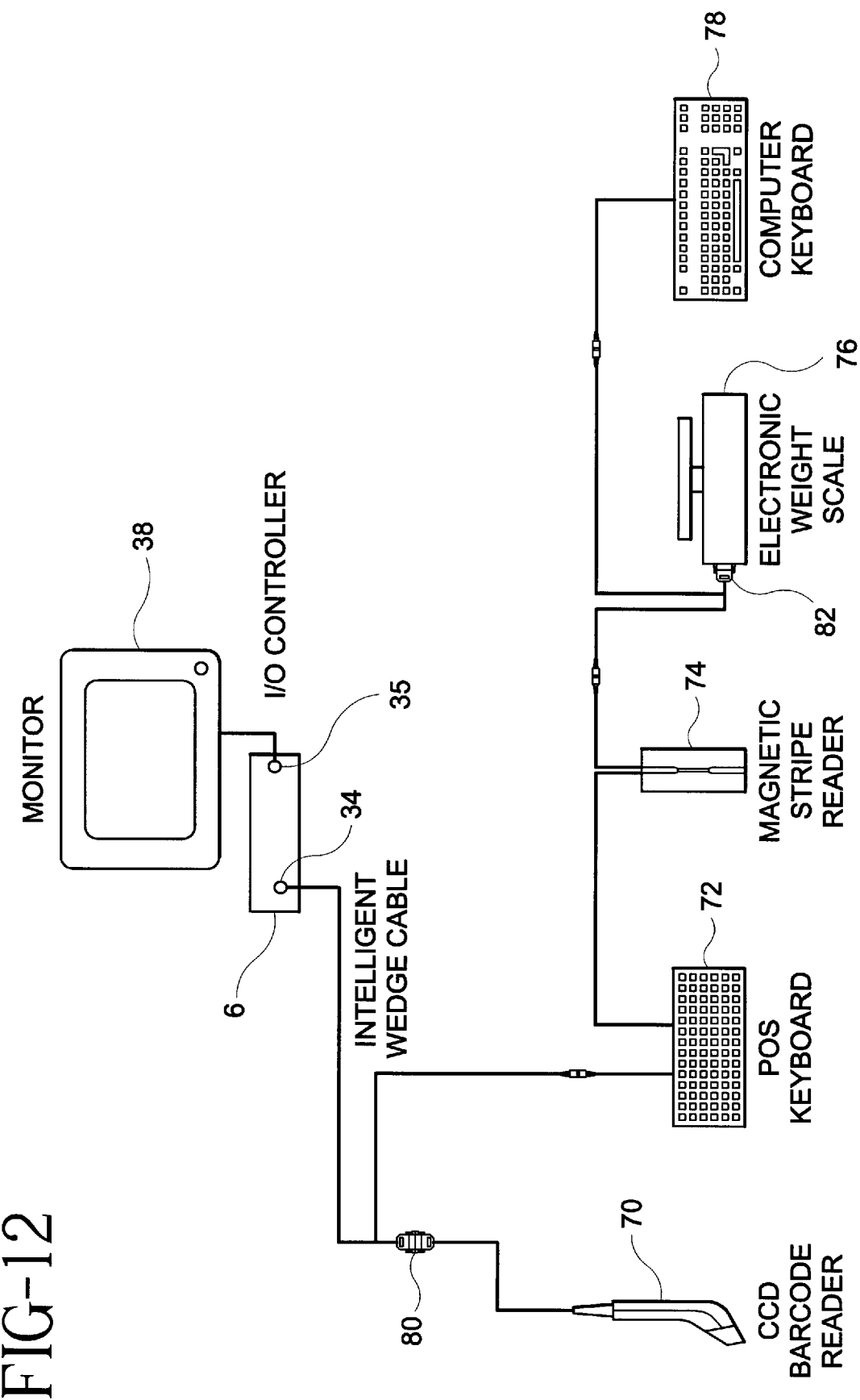
FIG. 12 is a diagram illustrating one example of an I/O controller node, including an I/O controller and related point-of-sale peripheral devices, formed in accordance with the present invention.

Referring to FIG. 12, there is shown a preferred I/O controller node, formed in accordance with the present invention. The I/O controller node preferably includes an I/O controller 6 with a CRT display or monitor 38 connected to a serial communications port 35 of the I/O controller 6. The I/O controller 6 further includes a keyboard port 34 to which a plurality of point-of-sale input peripheral devices are connected in a serial daisy chain arrangement. Typical POS peripherals for use with the present invention include a bar code reader 70, a POS keypad 72, a magnetic stripe reader 74, an electronic weight scale 76 and a standard computer keyboard 78. As shown in FIG. 12, POS input peripherals which do not ordinarily output their data in standard keyboard data format (for example, the bar code reader 70 or electronic weight scale 76) are preferably connected to the daisy chain bus via intelligent wedge interface cables 80 and 82. The interface cables 80 and 82 preferably receive and convert the non-standard data format to a standard keyboard data output format (or other compatible data format) for communicating with the I/O controller 6, as previously discussed.

In communicating with the plurality of I/O controllers 6, the master controller 4 will preferably append identification information, for example, in the form of a data header or equivalent identification tag, to data received from the server 2 (see FIG. 2). This identification information preferably specifies the particular peripheral device to ultimately receive the transmitted instruction or data. Each I/O controller 6 is connected to the network bus and receives the data stream from the master controller 4. Subsequently, each I/O controller 6 analyzes the header information associated with the transmitted data. If the header includes identification information which corresponds to an individual I/O controller 6, then that particular I/O controller 6 will pass the data onto the peripheral devices connected thereto.

While the master controller 4 and I/O controllers 6 are illustrated as standalone devices, it should be appreciated that integration of the master controller 4 within the server 2 or integration of the I/O controller 6 with one of the associated system peripherals is contemplated as being within the scope of the present invention.

A distributed computer network, formed in accordance with the present invention, is provided which is particularly well-suited for use with a point-of-sale system. The distributed computer network of the present invention is an open system which allows the connection of virtually unlimited peripheral devices without reducing available input/output ports. Furthermore, the distributed network allows connection/disconnection of peripheral devices without disassembling, re-configuring, or re-booting the system, thus reducing system down-time.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A distributed computer network for use with a general purpose computer having a communications port and capable of running application software for controlling the network, comprising:

a master controller having first and second communications ports, the first communications port of said master controller for operatively communicating with a general purpose computer and the second communications port for operatively communicating over a distributed computer network, said master controller having a processor and memory to provide data buffering and data bus arbitration over the distributed computer network; and an input/output controller having first and second communications ports, said first communications port of said input/output controller for operatively communicating with the second communications port of the master controller, wherein said communication between said master controller and said input/output controller is carried out over said distributed computer network, and said second communications port of said input/output controller for operatively communicating with one or more peripheral devices, wherein said communication between said input/output controller and said peripheral devices is carried out over a local network, said input/output controller having the capacity to communicate simultaneously with said peripheral devices using more than one communication protocol; and wherein said input/output controller performs local network management functions and translates commands from the application software to said peripheral devices.

2. A distributed computer network as defined by claim 1, wherein said master controller communicates with a plurality of input/output controllers, said plurality of input/output controllers are operatively connected together via a multidrop network bus.

3. A distributed computer network as defined by claim 1, wherein said peripheral devices are operatively connected together in a serial daisy chain configuration, said serial daisy chain forming a peripheral device bus.

4. A distributed computer network as defined by claim 3, further comprising a wedge interface for communicating between said second communications port of the input/output controller and said peripheral devices, said wedge interface including a first wedge communications port for communicating with the second communications port of the input/output controller, a second wedge communications port for communicating with a first peripheral device, and a third wedge communications port for serially communicating with a second peripheral device.

5. A distributed computer network as defined by claim 4, wherein said wedge interface receives data in a first predetermined data format and converts said data to a second predetermined data format which is compatible for communication with the input/output controller.

6. A distributed computer network as defined by claim 5, wherein said second predetermined data format is keyboard data format.

7. A distributed computer network as defined by claim 4, wherein said wedge interface further comprises a multiplexer for selectively disabling one of said peripheral devices from communicating with the I/O controller.

8. A distributed computer network as defined by claim 7, wherein said wedge interface further comprises a microprocessor for monitoring said peripheral device bus and controlling said multiplexer in response to whether said peripheral device bus is available for transmitting data to the input/output controller, wherein said microprocessor having memory for storing data from said peripheral devices when said peripheral device bus is not available for data transmission.

9. A distributed computer network for use with a general purpose computer having a communications port and being capable of running applications software for controlling the network, comprising:

a master controller having first and second communications ports, the first communications port of said master controller for operatively communicating with a general purpose computer and said second communications port comprising a multidrop network bus, said master controller having a processor and memory to provide data buffering and data bus arbitration over the distributed computer network; and an input/output controller having a first communications port for operatively communicating with said multidrop network bus, wherein said communication between said master controller and said input/output controller is carried out over said distributed computer network, a second communications port for operatively communicating with a display, and a third communications port for operatively communicating with one or more peripheral devices, said input/output controller having the capacity to communicate simultaneously with said display and said peripheral devices using more than one communication protocol, wherein said communication between said input/output controller and said peripheral devices is carried out over a local network; and wherein said input/output controller performs local network management functions and translates commands from the application software to said peripheral devices.

10. A distributed computer network as defined by claim 9, wherein said distributed network includes a plurality of input/output controllers, said plurality of input/output controllers operatively connected together via a common multidrop network bus for communicating with said master controller.

11. A distributed computer network as defined by claim 10, wherein said multidrop network bus is an RS-485 bus and wherein said master controller communicates with the general purpose computer via a RS-232 serial bus, whereby said master controller performs protocol management functions including conversion between RS-232 and RS-485 protocol, error correction and detection, bus arbitration and data buffering.

12. A distributed computer network as defined by claim 11, wherein each of said plurality of input/output controllers includes an indicating device, said display is a video monitor and one of said peripheral devices is a bump bar, and wherein said distributed computer network is configured as a Kitchen System.

13. A distributed computer network for use with a general purpose computer having a communications port and being capable of running applications software for controlling the network, comprising:

a master controller having first and second communications ports, the first communications port of the master controller for operatively communicating with a general purpose computer and the second communications port for operatively communicating over a distributed computer network, said master controller having a processor and memory to provide data buffering and data bus arbitration over the distributed computer network;

an input/output controller having a first communications port for operatively communicating with said master controller, wherein said communication between said master controller and said input/output controller is carried out over said distributed computer network, a second communications port for serially communicating with a plurality of peripheral devices, wherein said communication between said input/output controller and said peripheral devices is carried out over a local network, a third communications port for operatively communicating with a keyboard, and a fourth communications port for operatively communicating with a video monitor, said input/output controller having the capacity to communicate simultaneously with said keyboard, said video monitor and said peripheral devices using more than one communication protocol; and wherein said input/output controller performs local network management functions and translates commands from the application software to said peripheral devices.

14. A distributed computer network as defined by claim 13, wherein said plurality of peripheral devices are connected together in a serial daisy chain configuration, said serial daisy chain forming a peripheral device bus.

15. A distributed computer network as defined by claim 13, wherein said master controller communicates with a plurality of input/output controllers, said plurality of input/output controllers being operatively connected together via a multidrop network bus.

16. A distributed computer network as defined by claim 15, further comprising a wedge interface for communicating between said second communications port of the input/output controller and said plurality of peripheral devices, said wedge interface including a first wedge communications port for communicating with the second communications port of the input/output controller, a second wedge communications port for communicating with a first peripheral device, and a third wedge communications port for serially communicating with a second peripheral device.

17. A distributed computer network as defined by claim 16, wherein said wedge interface receives data in a first predetermined data format and converts said data to a second predetermined data format which is compatible for communication with the input/output controller.

18. A distributed computer network as defined by claim 17, wherein said second predetermined data format is keyboard data format.

19. A distributed computer network as defined by claim 16, wherein said wedge interface further comprises a multiplexer for selectively disabling one of said plurality of peripheral devices from communicating with the I/O controller.

20. A distributed computer network as defined by claim 19, wherein said plurality of peripheral devices are connected together in a serial daisy chain configuration, said serial daisy chain forming a peripheral device bus and wherein said wedge interface further comprises a microprocessor for monitoring said peripheral device bus and controlling said multiplexer in response to whether said peripheral device bus is available for transmitting data to the input/output controller, wherein said microprocessor having memory for storing data from said plurality of peripheral devices when said peripheral device bus is not available for data transmission.

* * * * *